(12) United States Patent
Raghavan

(10) Patent No.: US 7,295,623 B2
(45) Date of Patent: Nov. 13, 2007

(54) HIGH-SPEED COMMUNICATIONS TRANSCEIVER

(75) Inventor: Sreen Raghavan, La Jolla, CA (US)

(73) Assignee: Vativ Technologies, Inc., San Diego, CA (US)

( * ) Notice: Subject to any disclaimer, the term of this patent is extended or adjusted under 35 U.S.C. 154(b) by 601 days.

(21) Appl. No.: 09/904,432

(22) Filed: Jul. 11, 2001

(65) Prior Publication Data

US 2003/0058955 A1 Mar. 27, 2003

(51) Int. Cl.
*H04L 5/12* (2006.01)
(52) U.S. Cl. ....................... 375/265; 375/261
(58) Field of Classification Search ............... 375/242, 375/260, 285, 261, 265, 279; 370/278, 464, 370/478–535, 480, 532–545; 332/103; 341/59
See application file for complete search history.

(56) References Cited

U.S. PATENT DOCUMENTS

| | | | |
|---|---|---|---|
| 4,025,719 A | | 5/1977 | Nussbaumer |
| 4,455,649 A | * | 6/1984 | Esteban et al. ............ 370/522 |
| 4,599,732 A | | 7/1986 | LeFever |
| 4,679,225 A | | 7/1987 | Higashiyama |
| 4,710,922 A | * | 12/1987 | Scott ........................ 370/535 |
| 4,995,031 A | | 2/1991 | Aly et al. |
| 5,079,770 A | * | 1/1992 | Scott ........................ 370/536 |
| 5,285,474 A | | 2/1994 | Chow et al. |
| 5,293,378 A | * | 3/1994 | Shimizu .................... 370/474 |
| 5,535,228 A | * | 7/1996 | Dong et al. ................ 714/800 |
| 5,604,768 A | | 2/1997 | Fulton |
| 5,715,280 A | | 2/1998 | Sandberg et al. |
| 5,781,617 A | | 7/1998 | McHale et al. |
| 5,796,783 A | * | 8/1998 | Crawford .................. 375/298 |
| 5,808,671 A | | 9/1998 | Maycock et al. |
| 5,822,368 A | | 10/1998 | Wang |
| 5,838,268 A | * | 11/1998 | Frenkel ..................... 341/111 |
| 5,838,732 A | | 11/1998 | Carney |
| 5,838,740 A | | 11/1998 | Kallman et al. |
| 5,844,950 A | | 12/1998 | Aono et al. |
| 5,852,629 A | | 12/1998 | Iwamatsu |
| 5,930,231 A | * | 7/1999 | Miller et al. .............. 370/210 |
| 5,991,311 A | | 11/1999 | Long et al. |

(Continued)

FOREIGN PATENT DOCUMENTS

CN 2161025 Y 4/1994

(Continued)

OTHER PUBLICATIONS

Second Examination Report for EP Appl. No. 02 748 158.9, dated Mar. 14, 2006 (Our ref. 9146.01-155), 10 pages.

(Continued)

*Primary Examiner*—Mohammed Ghayour
*Assistant Examiner*—Lawrence Williams
(74) *Attorney, Agent, or Firm*—Finnegan, Henderson, Farabow, Garrett & Dunner, L.L.P.

(57) ABSTRACT

A communication system is disclosed that allows high data-rate transmission of data between components. N-bit parallel data is transmitted in K-frequency separated channels on the transmission medium so as to fully take advantage of the overall bandwidth of the transmission medium. As a result, a very high data-rate transmission can be accomplished with low data-bit transmission on individual channels.

39 Claims, 10 Drawing Sheets

U.S. PATENT DOCUMENTS

| | | | |
|---|---|---|---|
| 5,999,575 A * | 12/1999 | Tanaka et al. | 375/329 |
| 6,005,893 A * | 12/1999 | Hyll | 375/260 |
| 6,044,112 A | 3/2000 | Koslov | |
| 6,121,828 A | 9/2000 | Sasaki | |
| 6,128,114 A | 10/2000 | Wingo | |
| 6,160,820 A * | 12/2000 | Isaksson et al. | 370/480 |
| 6,246,664 B1 * | 6/2001 | Bohm | 370/206 |
| 6,252,900 B1 * | 6/2001 | Liu et al. | 375/219 |
| 6,259,745 B1 | 7/2001 | Chan | |
| 6,269,129 B1 | 7/2001 | Rhee et al. | |
| 6,275,544 B1 | 8/2001 | Aiello et al. | |
| 6,292,559 B1 * | 9/2001 | Gaikwad et al. | 379/417 |
| 6,351,293 B1 | 2/2002 | Perlow | |
| 6,351,677 B1 | 2/2002 | Leyonhjelm et al. | |
| 6,407,843 B1 * | 6/2002 | Rowan et al. | 398/202 |
| 6,418,161 B1 * | 7/2002 | Shively et al. | 375/222 |
| 6,438,174 B1 * | 8/2002 | Isaksson et al. | 375/261 |
| 6,441,683 B1 | 8/2002 | Hwang et al. | |
| 6,462,679 B1 * | 10/2002 | Van Nguyen | 341/50 |
| 6,477,207 B1 * | 11/2002 | Lindholm | 375/260 |
| 6,496,540 B1 * | 12/2002 | Widmer | 375/242 |
| 6,522,702 B1 | 2/2003 | Maruyama | |
| 6,529,303 B1 | 3/2003 | Rowan et al. | |
| 6,647,071 B2 | 11/2003 | Sommer et al. | |
| 6,678,319 B1 | 1/2004 | Jamali | |
| 6,714,529 B1 | 3/2004 | Tanabe et al. | |
| 6,724,331 B1 * | 4/2004 | El-Ghoroury et al. | 341/118 |
| 6,731,704 B1 | 5/2004 | Kiyanagi | |
| 6,804,497 B2 | 10/2004 | Kerth et al. | |
| 6,807,234 B2 * | 10/2004 | Hansen | 375/259 |
| 6,831,954 B1 | 12/2004 | Mandyam | |
| 6,970,448 B1 | 11/2005 | Sparrell et al. | |
| 6,975,685 B1 * | 12/2005 | Merriam, Jr. | 375/260 |
| 2001/0031014 A1 * | 10/2001 | Subramanian et al. | 375/260 |
| 2002/0039052 A1 | 4/2002 | Straub et al. | |
| 2002/0086651 A1 | 7/2002 | Prentice et al. | |
| 2002/0093994 A1 * | 7/2002 | Hendrickson et al. | 370/536 |
| 2002/0110206 A1 | 8/2002 | Becker et al. | |
| 2002/0159551 A1 * | 10/2002 | Ekvetchavit et al. | 375/350 |
| 2002/0163974 A1 | 11/2002 | Friedman | |
| 2003/0017809 A1 | 1/2003 | Garlepp et al. | |
| 2003/0054782 A1 | 3/2003 | Snider | |
| 2003/0112798 A1 * | 6/2003 | Ziegler et al. | 370/366 |
| 2004/0091028 A1 | 5/2004 | Aronson et al. | |
| 2004/0106380 A1 | 6/2004 | Vassiliou et al. | |
| 2004/0121753 A1 | 6/2004 | Sugar et al. | |
| 2004/0130483 A1 | 7/2004 | Brilka et al. | |
| 2004/0137941 A1 | 7/2004 | Tanaka et al. | |
| 2004/0162023 A1 | 8/2004 | Cho | |
| 2004/0190660 A1 | 9/2004 | Morris et al. | |

FOREIGN PATENT DOCUMENTS

| | | |
|---|---|---|
| EP | 0 554 056 A2 | 8/1993 |
| EP | 0554056 B1 | 5/1998 |
| EP | 0987830 A | 3/2000 |
| WO | 97/30521 | 8/1997 |
| WO | WO 99/45683 | 9/1999 |
| WO | WO99/45683 | 9/1999 |
| WO | WO 00/51303 * | 8/2000 |
| WO | WO 00/51303 A | 8/2000 |
| WO | WO 03/007564 A | 1/2003 |
| WO | WO 2004/109948 A2 | 12/2004 |

OTHER PUBLICATIONS

International Preliminary Examination Report for WO Application No. PCT/US02/22339, dated Sep. 17, 2004 (24 pages).

EPO Response to Examination Report for EP Appl. No. 02 748 158.9, dated Jul. 5, 2005 (23 pages).

Taiwanese Office Action granting acceptance for Appl. No. 91115102, dated Jul. 13, 2005 (4 pages).

Taiwanese Response to Official Letter for Appl. No. 91115102, dated May 26, 2005 (6 pages).

Taiwanese Official Letter for Appl. No. 91115102, dated May 3, 2005 (3 pages).

International Preliminary Report on Patentability for WO Application No. PCT/US2004/014538, mailed Dec. 22, 2005 (8 pages).

Article 34 Amendment for WO Appl. No. PCT/US02/22339, filed Dec. 18, 2003 (31 pages).

Written Opinion for WO Application No. PCT/US02/22339, dated Feb. 13, 2004 (11 pages).

Clark, Jr., G.C. and Cain, J.B., Error Correction Coding for Digital Communications (Plenum Press, New York 1981) pp. 253-264.

International Search Report dated Jul. 12, 2004, from corresponding PCT Application No. PCT/US04/014538.

Lee, Edward A. and Messerschmitt, David G., Digital Communications (Kluwer Academic Publishers, 1988) pp. 371-402.

Sklar, Bernard, Digital Communications, Fundamentals and Applications (Prentice-Hall, Inc., 1988).

Ungerboeck, G., "Channel Coding with Multilevel/Phase Signals," IEEE Transactions on Information Theory, vol. It-28, Jan. 1982, pp. 55-67.

Ungerboeck, G., "Trellis Coding Modulation with Redundant Signal Sets, Part I. Introduction," IEEE Communications Magazine, vol. 25, No. 2, Feb. 1987, pp. 5-11.

Office Action issued by the Chinese IPO on Mar. 17, 2006, with English translation, 18 pages.

Response to Final Office Action filed May 1, 2006 in U.S. Appl. No. 09/965,242.

Response to Office Action dated Mar. 28, 2006, in U.S. Appl. No. 10/071,771.

Office Action mailed Jul. 26, 2006 in U.S. Appl. No. 09/965,242.

Final Office Action mailed Jun. 13, 2006, in U.S. Appl. No. 10/071,771.

Response to Office Action dated Aug. 1, 2006, in U.S. Appl. No. 10/071,771.

EPO Examination Report for EP Application No. 02 748 158.9, dated Dec. 8, 2004 (4 pages).

Response to Office Action dated Oct. 28, 2005 in U.S. Appl. No. 09/965, 242.

Final Office Action mailed Jan. 30, 2006 in U.S. Appl. No. 09/965,242.

Office Action dated Dec. 28, 2005 in U.S. Appl. No. 10/071,771.

Response to Office Action dated Oct. 8, 2006, to the Chinese IPO.

Response to Second Examination Report for EP Appl. No. 02 748 158.9, dated Sep. 12, 2006.

Response to Office Action dated Oct. 18, 2006, in U.S. Appl. No. 09/965,242.

Office Action dated Nov. 22, 2006, in U.S. Appl. No. 10/310,355.

Preliminary Amendment dated Oct. 18, 2006, in U.S. Appl. No. 10/454,382.

Office Action dated Oct. 31, 2006, in U.S. Appl. No. 10/454,382.

Reply to Office Action dated Nov. 22, 2006, in U.S. Appl. No. 10/454,382.

Second Office Action issued by the Chinese IPO on Dec. 15, 2006 - English translation only.

Final Office Action dated Jan. 4, 2007, in U.S. Appl. No. 09/965,242.

Amendment After Final dated Feb. 21, 2007, in U.S. Appl. No. 09/965,242.

Notice of Allowance dated Jan. 4, 2007, in U.S. Appl. No. 10/071,771.

Response to Office Action dated Dec. 20, 2006, in U.S. Appl. No. 10/310,255.

* cited by examiner

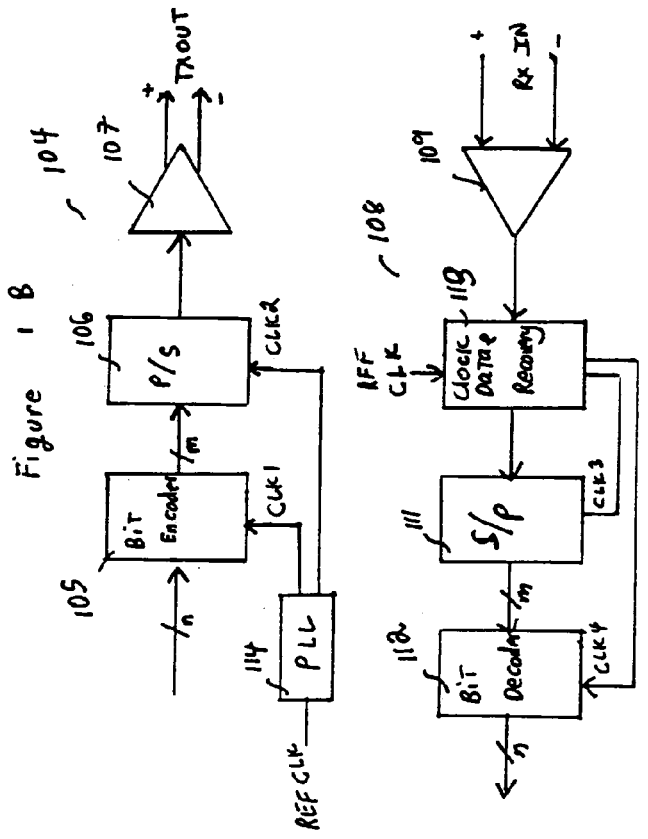
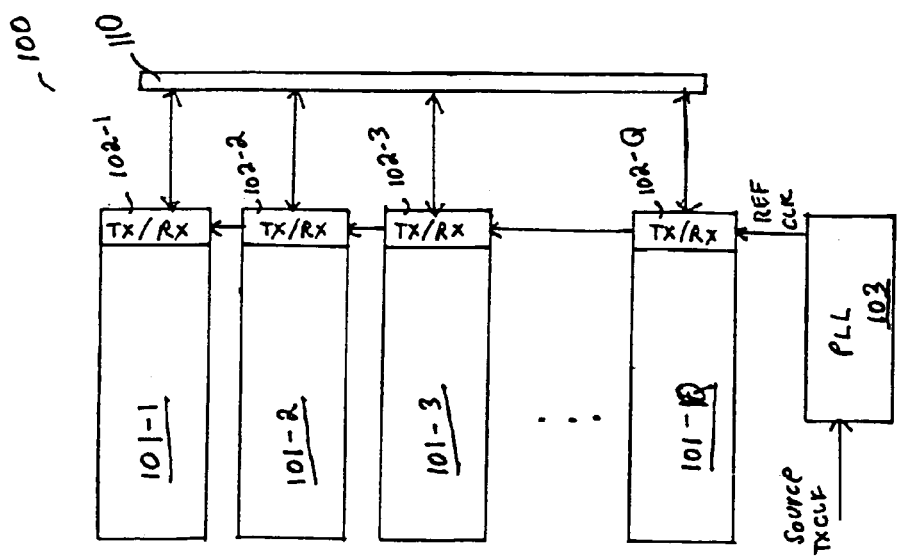

HIGH-SPEED COMMUNICATIONS TRANSCEIVER

BACKGROUND

1. Field of the Invention

The present invention is related to high-speed communications of data in a communication system and, in particular, to high data rate transmission of data between components in a communication system.

2. Discussion of Related Art

Many conventional systems for transmitting data between components within a cabinet or between cabinets of components utilize copper or optical backplanes for transmission of digital data. For example, high data rate transceivers are utilized in many backplane environments, including optical switching devices, router systems, switches, chip-to-chip communications and storage area networking switches. Other systems that utilize high speed communication between components include inter-cabinet communications and chip-to-chip communications. Typical separations of components in such systems is between about 0.1 and about 10 meters.

Existing techniques utilized in such environments typically use non-return to zero (NRZ) modulation to send and receive information over high-speed backplanes or for high data rate chip-to-chip interconnects. Typically, the transceiver for sending high-speed data over a backplane is called a serializer/deserializer, or SERDES, device.

FIG. 1A shows a block diagram of a backplane environment 100. Components 101-1 through 101-Q are coupled to transmit and receive data through input/output (I/O) ports 102-1 through 102-Q, respectively, to backplane 110. Conventionally, components 101-1 through 101-Q are SERDES devices.

FIG. 1B shows a block diagram of a conventional transmitter portion of one of SERDES devices 101-1 through 101-Q on I/O ports 102-1 through 102-Q, respectively. Parallel data is received in a bit encoder 105. Bit encoder 105 encodes the parallel data for example, by adding redundancy in the input data, to ensure a minimum rate of data transitions in the output data stream. Typical encoding schemes include rate 8/10 (8 bit input to 10 bit output) encoding. The parallel data is serialized in parallel to serial converter 106. Output driver 107 then receives the serialized data from parallel to serial converter 106 and outputs, usually, a differential voltage signal for transmission over backplane 110. In addition, there is typically a phase locked loop (PLL) 114 that provides the necessary clock signals for encoder 105 and parallel-to-serial converter 106. The input signal to PLL 114 is a reference clock signal from a system PLL 103.

FIG. 1C shows a conventional receiver 108 of one of SERDES devices 101-1 through 101-Q on I/O ports 102-1 through 102-Q, respectively, of FIG. 1A. Input driver 109 receives differential voltage signal from backplane 110 and outputs the analog data signal to clock and data recovery circuit 113. Data recovery 113 can, in some systems, perform equalization and recover the timing and output a serial bit stream of data to serial-to-parallel converter 111. The serial data is input to bit decoder 112 which converts the parallel data to parallel decoded data. Clock and data recovery circuit 113 also outputs the necessary clock signals to serial-to-parallel converter 111 and bit decoder 112.

A conventional SERDES system 100 can enable serial data communication at data rates as high as 2.5 Gbps to 3.125 Gbps over a pair of FR4 copper traces in a copper backplane communication system. The biggest problem with existing SERDES systems 100 is that they are very bandwidth inefficient, i.e., they require 3.125 GHz of bandwidth to transmit and receive 2.5 Gbps of data over a single pair of copper wires. Therefore, it is very difficult to increase the data rates across backplane bus 110. Additionally, SERDES system 100 requires the implementation of a high clock rate (3.125 GHz for 2.5 Gbps data rates) phase locked loop (PLL) 114 implemented to transmit data and recovery of high clock rates in data recovery 113. The timing window within which receiver 108 needs to determine whether the received symbol in data recovery 110 is a 1 or a 0 is about 320 ps for the higher data rate systems. This timing window creates extremely stringent requirements on the design of data recovery 113 and PLL 114, as they must have very low peak-to-peak jitter.

Conventional SERDES system 100 also suffer from other problems, including eye closure due to intersymbol interference (ISI) from the dispersion introduced by backplane 110. The ISI is a direct result of the fact that the copper traces of backplane 110 attenuate higher frequency components in the transmitted signals more than the lower frequency components in the transmitted signal. Therefore, the higher the data rate the more ISI suffered by the transmitted data. In addition, electrical connectors and electrical connections (e.g., vias and other components) used in SERDES device 100 cause reflections, which also cause ISI.

To overcome these problems, equalization must be performed on the received signal in data recovery 113. However, in existing very high data-rate communication systems, equalization is very difficult to perform, if not impossible due to the high baud rate. A more commonly utilized technique for combating ISI is known as "pre-emphasis", or pre-equalization, performed in bit encoder 105 and output driver 107 during transmission. In some conventional systems, the amplitude of the low-frequencies in the transmitted signal is attenuated to compensate for the higher attenuation of the high frequency component by the transmission medium of bus 110. While this makes the receiver more robust to ISI, pre-emphasis reduces the overall noise tolerance of transmission over backplane 110 of backplane communication system 100 due to the loss of signal-to-noise ratio (SNR). At higher data rates, conventional systems quickly become intractable due to the increased demands.

Therefore, there is a need for a more robust system for transmitting data between components on a backplane or data bus at very high speeds.

SUMMARY

In accordance with the present invention, a data transmission system is presented that allows very high data transmission rates over a data bus that utilizes the signal attenuation properties of the copper based backplane interconnect system. In addition, this transmission scheme does not result in increased intersymbol interference at the receiver despite transmitting data at a very high speed. The data transmission system includes a transmitter and a receiver coupled through a transmission medium. The transmitter receives parallel data having N bits and separates the N bits into K subsets for transmission into K frequency separated channels on a transmission medium. The receiver receives the data from the K frequency separated channels from the transmission medium and recovers the N parallel bits of data. In some embodiments, the N parallel bits are separated into K subsets of bits, the K subsets of bits are encoded into a K symbols, each of which is up-converted to a carrier frequency appropriate to one of the K channels. The summed output signal resulting from up-converting into each of the K channels is transmitted over the transmission medium.

In some embodiments, the transmitter includes K separate modulators. Each of the K modulators receives a subset of the N-bits, encodes the subset of bits, and modulates the encoded symbols with a carrier signal at a frequency separated from that of others of the K modulators. The summed signals from each of the K separate modulators is transmitted over the transmission medium. The transmission medium can be any medium, including optical, twisted copper pair, or copper based backplane interconnect channel.

In some embodiments, each of the K modulators receives a subset of the N data bits, encodes the subset, maps the encoded subset onto a symbol set, and up-converts the analog symbol stream to a carrier frequency assigned to that modulator. The up-converted symbol stream is then transmitted through the transmission medium to a receiver having a demodulator for down-converting and recovering the data stream transmitted on each of the carrier frequencies. For example, in some embodiments, each of the K modulators receives the subset of bits, encodes them with a trellis encoder and maps them onto a quadrature-amplitude modulated (QAM) symbol set. In some embodiments, the symbols output from the QAM mapping are processed through a digital-to-analog converter before being up-converted to a carrier frequency to produce the output signal from the modulator. Any encoding and symbol mapping scheme can be utilized.

Each of the output signals from the K modulators are summed for transmission in K separate transmission channels on the transmission medium. The receiver receives the summed signals, with data transmitted at K separate channels. In some embodiments, the receiver down-converts the summed signals by the frequency of each of the K separate channels to recover the symbols transmitted in each of the K separate channels. The subsets of digital data can then be recovered from the recovered symbols.

The receiver receives the combined signal, separates the signal by carrier frequency, and recovers the bits from each carrier frequency. In some embodiments, the signal received from the transmission medium is received into K parallel demodulators. Each of the K demodulators separates out the signal centered around the carrier frequency allocated to that channel by the transmitter, equalizes the signal, and decodes the signal to retrieve the subset of N bits assigned to the corresponding transmitter modulator.

As a result, parallel streams of serial data bits are separated into separate subsets which are transmitted on different frequency bands to form separate channels on the transmission medium. Therefore, the data rate and the symbol rate transmitted in each of the separate channels can be much lower than the overall data transmission rate. The lower data rate and symbol rate in each channel provides for simpler receiver processing with many fewer problems (e.g., speed of components utilized for equalization and data recovery) than the high data rate transmissions. In addition, because the symbol rates are lower, the amount of receiver equalization needed on each of the K channels is quite small, and can be implemented with a simpler equalization structures. Because of the lower symbol rates, receiver signals can be processed with complex, optimal algorithms.

In some embodiments, the transmission into each of the available transmission channels can be bit-loaded so that the channels occupying the lower part of frequency spectrum can be modulated with higher order symbol constellations to provide higher bit throughput per modulated symbol in those channels. Conversely, the channels occupying the higher carrier frequencies can be modulated with lower order symbol constellations to provide lower number of bits per modulated symbol. By performing bit-loading, the data throughput that can be achieved over the transmission medium, for example a copper based interconnect system, can be maximized because the signal-to-noise ratio (SNR) available in the channel is higher at lower frequencies in the channel than in the higher frequencies. Thus, the bit-loaded transmission technique can be tailored to maximize the overall capacity of a copper based interconnect system. In embodiments with QAM symbol constellations, for example, QAM constellations with more symbols (and therefore which can carry more bits per symbol) can be transmitted in channels with lower carrier frequencies while QAM constellations with fewer symbols (and therefore representing fewer bits per symbol) can be transmitted in channels with higher carrier frequencies.

These and other embodiments are further described below with respect to the following figures.

SHORT DESCRIPTION OF THE FIGURES

In the figures, elements designated with the same identifications on separate figures are considered to have the same or similar functions.

DETAILED DESCRIPTION

Figure 2A:
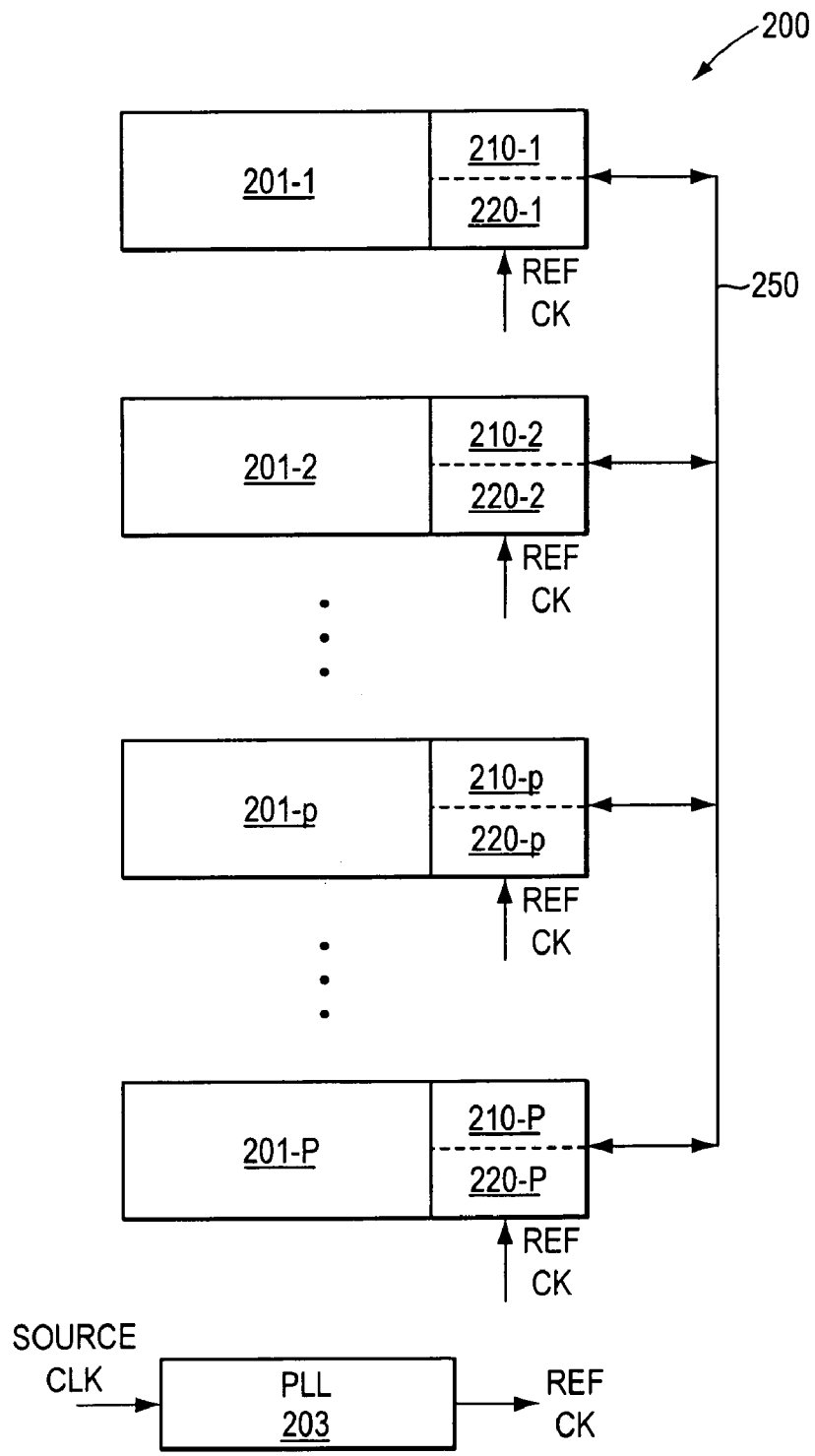
FIG. 2A shows a block diagram of a transmission system according to the present invention.

FIG. 2A shows a block diagram of a transmission system 200 according to the present invention. System 200 includes any number of components 201-1 through 201-P, with component 201-p representing an arbitrary one of components 201-1 through 201-P, coupled through a transmission medium 250. Transmission medium 250 may couple component 201-p to all of the components 201-1 through 201-P or may couple component 201-p to selected ones of components 201-1 through 201-P. In some embodiments, components 201-1 through 201-P are coupled through FR4 copper traces.

System 200 can represent any backplane system, any chassis-to-chassis digital communication system, or any chip-to-chip interconnect with components 201-1 through 201-P representing individual cards, cabinets, or chips, respectively.

Transmission channel 250 can represent any transmission channel, including optical channels, wireless channels, or metallic conductor channels such as copper wire or FR4 copper traces. Typically, transmission channel 250 attenuates higher frequency signals more than lower frequency signals. As a result, intersymbol interference problems are greater for high data rate transmissions than for lower data rate transmissions. In addition, cross-talk from neighboring signals increases with transmission frequency.

Components 201-1 through 201-P include transmitters 210-1 through 210-P, respectively, and receivers 220-1 through 220-P, respectively. Further, in some embodiments, timing for all of components 201-1 through 201-P can be provided by a phase-locked-loop (PLL) 203 synchronized to a transmit clock signal. In some embodiments, PLL 203 provides a reference clock signal and each of components 201-1 through 201-P can include any number of phase locked loops to provide internal timing signals.

In some systems, for example backplane systems or cabinet interconnects, the transmission distance through transmission channel 250, i.e. the physical separation between components 201-1 through 201-P, can be as low as 1 to 1.5 meters. In some chip-to-chip environments, the physical separation between components 201-1 though 201-P can be much less. In some embodiments of the present invention, separations between components 201-1 through 201-P as high as about 100 meters can be realized. Furthermore, in some embodiments transmission channel 250 can be multiple twisted copper pair carrying differential signals between components 201-1 through 201-P. In some embodiments, components 201-1 through 201-P can share wires so that fewer wires can be utilized. In some embodiments, however, dedicated twisted copper pair can be coupled between at least some of components 201-1 through 201-P. Further, transmission medium 250 can be an optical medium, wireless medium, or data bus medium.

Figure 2B:
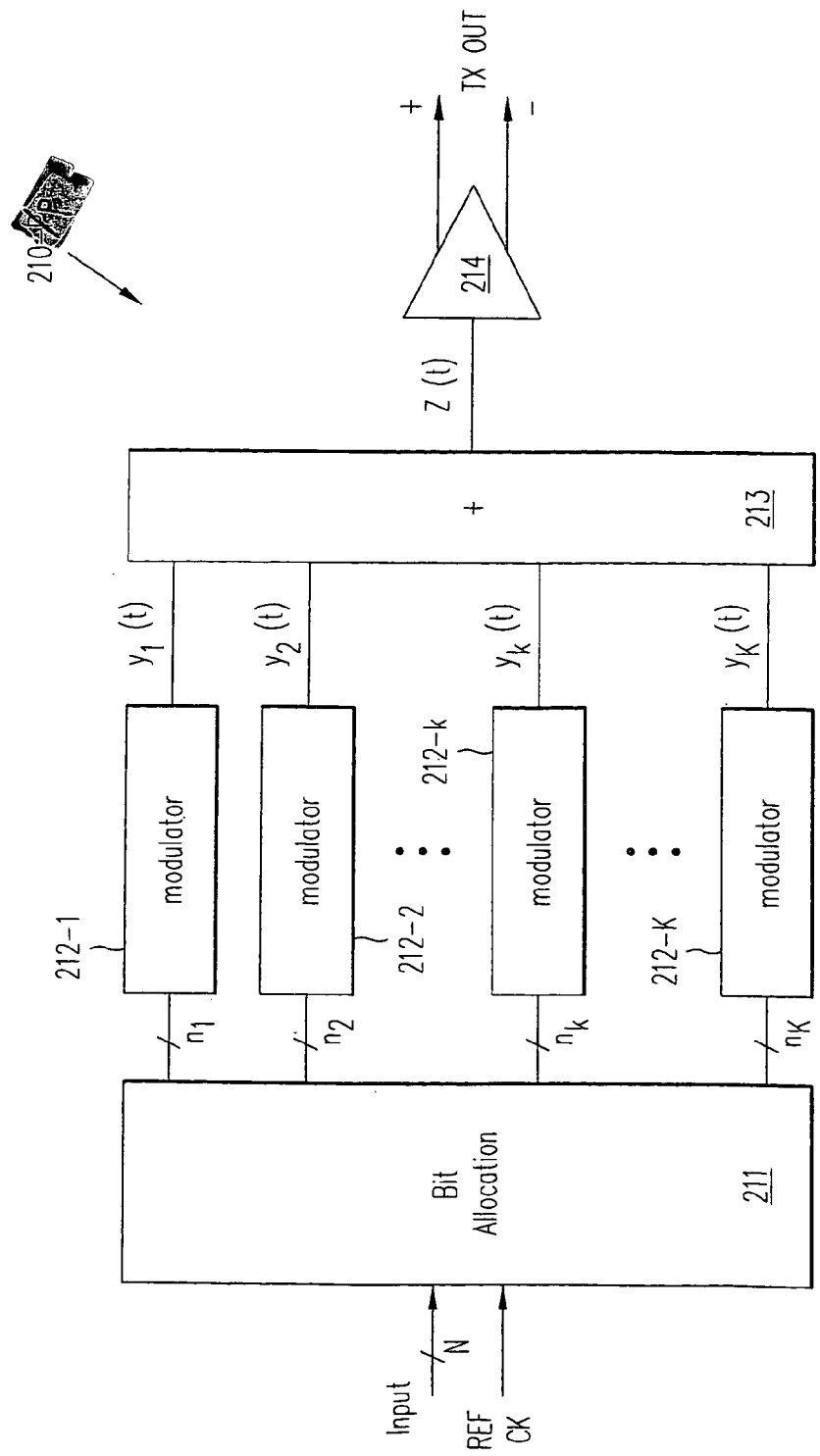
FIG. 2B shows a block diagram of a transmitter according to the present invention.

FIG. 2B shows a block diagram of an embodiment of transmitter 210-p, an arbitrary one of transmitters 210-1 through 210-P. Transmitter 210-p receives an N-bit parallel data signal at a bit allocation block 211. Bit allocation block 211 also receives the reference clock signal from PLL 203. Bit allocation block 211 segregates the N input bits into K individual channels such that there are $n_1$ through $n_K$ bits input to modulators 212-1 through 212-K, respectively. In some embodiments, each of the N bits is assigned to one of the K individual channels so that the sum of $n_1$ through $n_K$ is the total number of bits N. In some embodiments, bit allocation block 211 may include error pre-coding, redundancy, or other overall encoding such that the number of bits output, i.e.

$$\sum_{i=1}^{K} n_i,$$

is greater than N.

Figure 3:
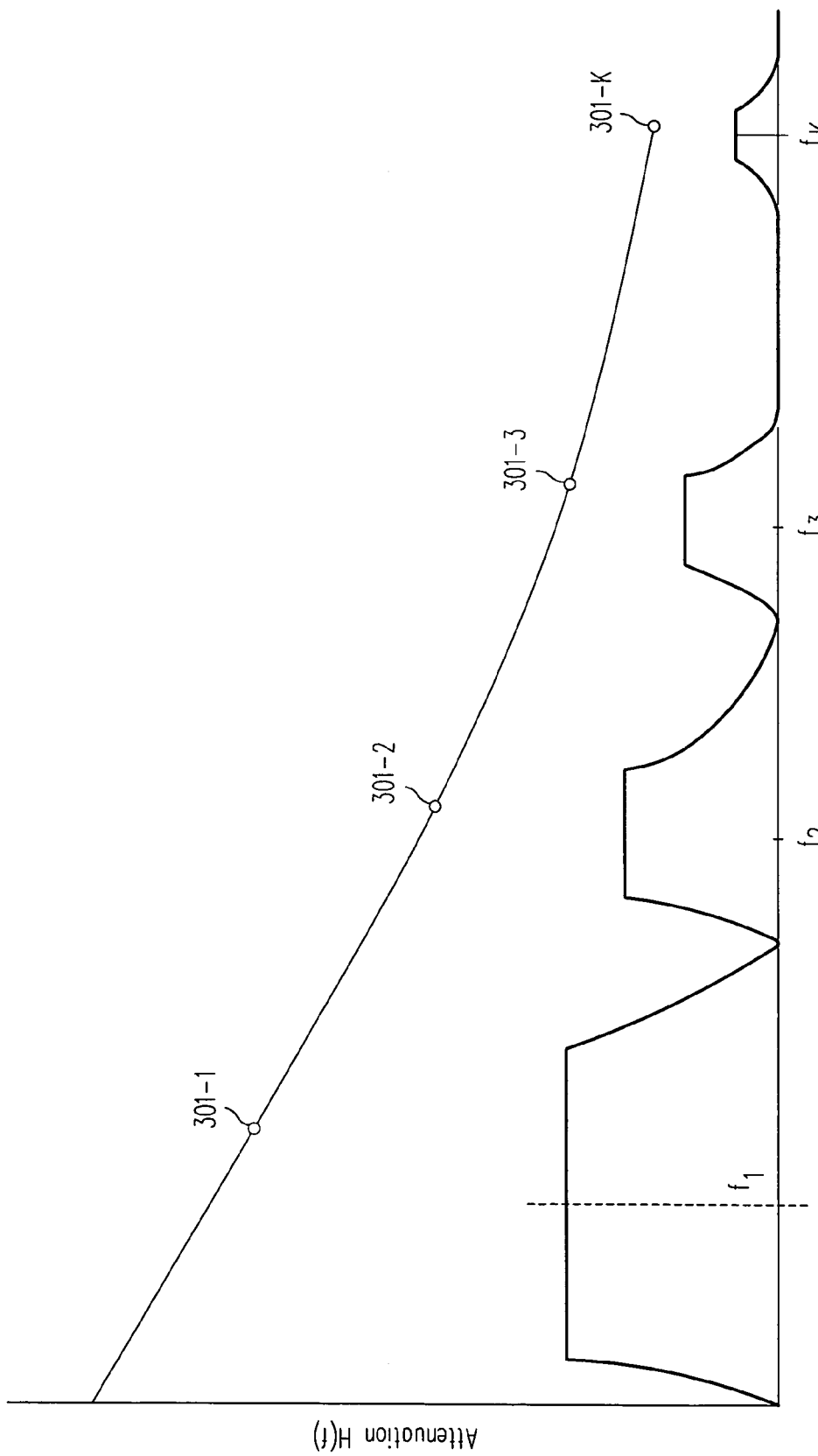
FIG. 3 shows a graph of attenuation versus transmission band on the transmission medium according to the present invention.

Each of modulators 212-1 through 212-K encodes the digital data input to it and outputs a signal modulated at a different carrier frequency. Therefore, the $n_k$ digital data bits input to modulator 212-k, an arbitrary one of modulators 212-1 through 212-K, is output as an analog signal in a kth transmission channel at a carrier frequency $f_k$. FIG. 3 shows schematically the transport function for a typical transmission channel 250 (FIG. 2A), H(f). As is shown, the attenuation at higher frequencies is greater than the attenuation at lower frequencies. Modulators 212-1 through 212-K transmit analog data at carrier frequencies centered about frequencies $f_1$ through $f_K$, respectively. Therefore, modulators 212-1 through 212-K transmit into transmission channels 301-1 through 301-K, respectively. The width of the bands of each of transmission channels 301-1 through 301-K can be narrow enough so that there is little to no overlap between adjacent ones of transmission channels 301-1 through 301-K. In some embodiments, since the attenuation for the lower frequency channels is much smaller than the attenuation for the higher frequency channels, lower frequency channels can be bit-loaded to carry higher number of bits per baud interval than the number of bits per baud interval that can be carried at higher carrier frequencies.

The analog output signal from each of modulators 212-1 through 212-K, $y_1(t)$ through $y_K(t)$, then represents the transmission signal in each of channels 301-1 through 301-K, respectively. Signals $y_1(t)$ through $y_K(t)$, then, are input to summer 213 and the summed analog signal z(t) is input to output driver 214. In some embodiments, output driver 214 generates a differential transmit signal corresponding to signal z(t) for transmission over transmission medium 250. Output driver 214, if transmission medium 250 is an optical medium, can also be an optical driver modulating the intensity of an optical signal in response to the signal z(t).

Figure 2C:
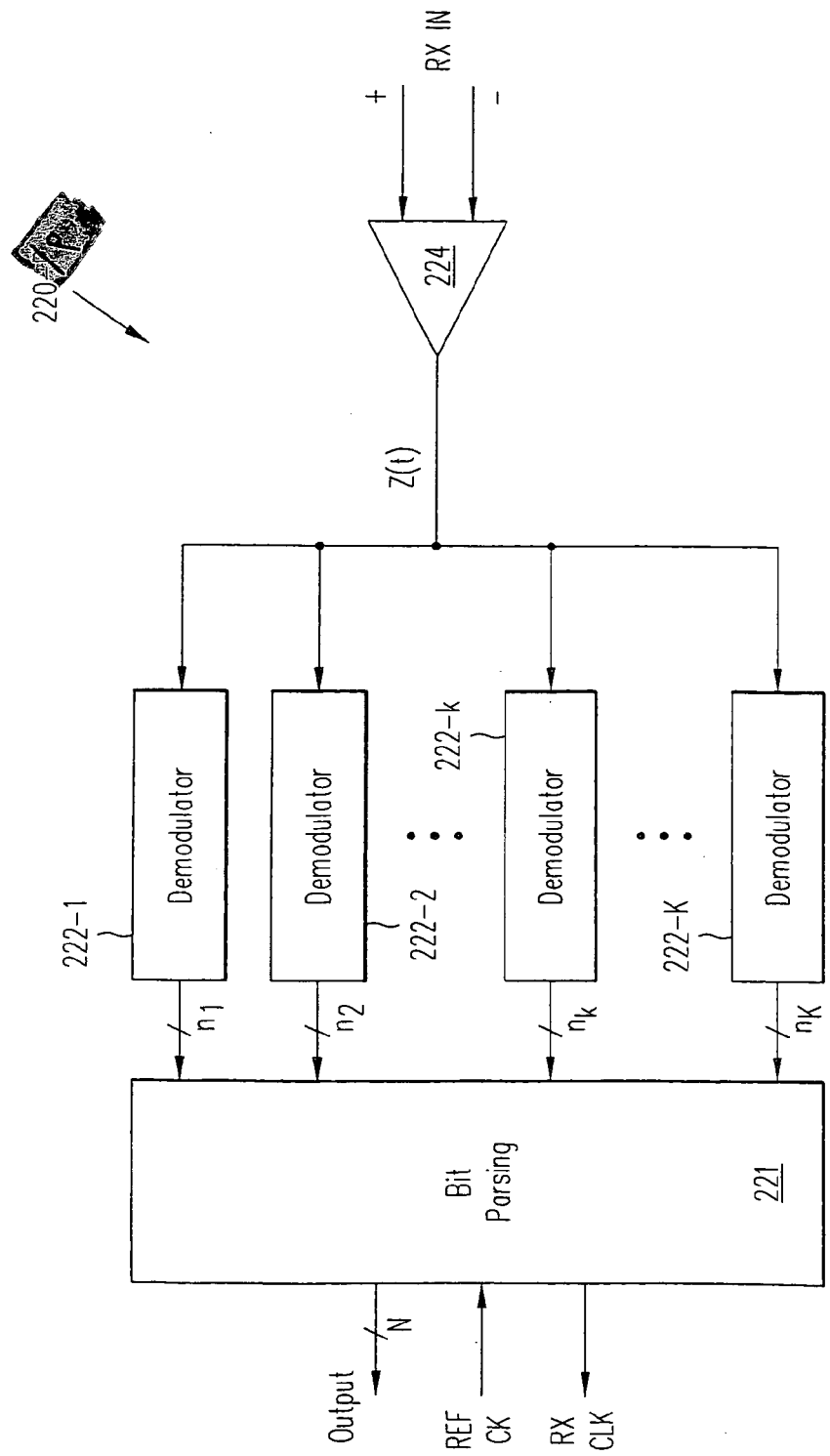
FIG. 2C shows a block diagram of a receiver according to the present invention.

FIG. 2C shows an embodiment of a receiver 220-p, which can be an arbitrary one of receivers 220-1 through 220-P of FIG. 2A. Receiver 220-p can receive a differential receive signal, which originated from one of transmitters 210-1 through 210-P, into an input buffer 224. In some embodiments, an optical signal can be received at input buffer 224, in which case input buffer 224 includes an optical detector. The output signal from input buffer 224, Z(t), is closely related to the output signal z(t) of summer 213. However, the signal Z(t) shows the effects of transmission through transmission medium 250 on z(t), including intersymbol interference (ISI).

The signal Z(t) is input to each of demodulators 222-1 through 222-K. Demodulators 222-1 through 222-K demodulates the signals from each of the transmission channels 301-1 through 301-K, respectively, and recovers the bit stream from each of carrier frequencies $f_1$ through $f_K$, respectively. The output signals from each of demodulators 222-1 through 222-K, then, include parallel bits $n_1$ through $n_K$, respectively. The output signals are input to bit parsing 221 where the transmitted signal having N parallel bits is reconstructed. Receiver 220-p also receives the reference clock signal from PLL 203, which is used to generate internal timing signals. Furthermore, receiver 220-p outputs a receive clock signal with the N-bit output signal from bit parsing 221.

In some embodiments, N-bits of high-speed parallel digital data per time period is input to bit allocation 211 of transmitter 210-p along with a reference clock signal. Data is transmitted at a transmit clock rate of CK1, which can be determined by an internal phase-locked-loop from the reference clock signal. Each of these input signals of N-bits can change at the rate of a transmit clock signal CK1. The transmit clock signal CK1 can be less than or equal to η GHz/N, where η represents the total desired bit rate for transmission of data from transmitter 210-p over transmission medium 250. The resultant maximum aggregate input data rate, then, equals η Gbps. The η Gbps of aggregate input data is then split into K sub-channels 301-1 through 301-K (see FIG. 3) which are generated by modulators 212-1 through 212-K, respectively, such that:

$$\sum_{k=1}^{K} B_k n_k = \eta Gbps, \quad (1)$$

where $n_k$ is the number of bits transmitted through the kth transmission band, centered about frequency $f_k$, with a symbol baud rate on the $k^{th}$ sub-channel being equal to $B_k$.

In some embodiments of the invention, each of the K sub-channels 301-1 through 301-K can have the same baud rate B. In general, the baud rate $B_k$ of one sub-channel 301-k, which is an arbitrary one of sub-channels 301-1 through 301-K, can differ from the baud rate of other sub-channels. Additionally, bit-loading can be accomplished by choosing symbol sets which carry a larger number of bits of data for transmission channels at lower frequencies and symbol sets which carry a lower number of bits of data for transmission channels at higher frequencies (i.e., $n_k$ is higher for lower frequencies).

In the case of a copper backplane interconnect channel of trace length l<2 meters, for example, the signal-to-noise ratio of the lower carrier frequency channels is substantially greater than the signal-to-noise ratio available on the higher sub-channels because the signal attenuation on the copper trace increases with frequency and because the channel noise resulting from alien signal cross-talk increases with frequency. These properties of the copper interconnect channel can be exploited to "load" the bits/baud of the K sub-channels so that the overall throughput of the interconnect system is maximized. For example, digital communication signaling schemes (modulation+coding), see, e.g. BERNARD SKLAR, DIGITAL COMMUNICATIONS, FUNDAMENTALS AND APPLICATIONS (Prentice-Hall, Inc.,1988), can be utilized that provide higher bit density per baud interval over channels occupying the lower region of the frequency spectrum, and that result in lower bit density over channels that occupy higher frequencies. This "bit-loading" is especially important when the data rates over copper interconnect channel need to be increased, for example to a rate in excess of 10 Gbps per differential copper pair.

Figure 4:
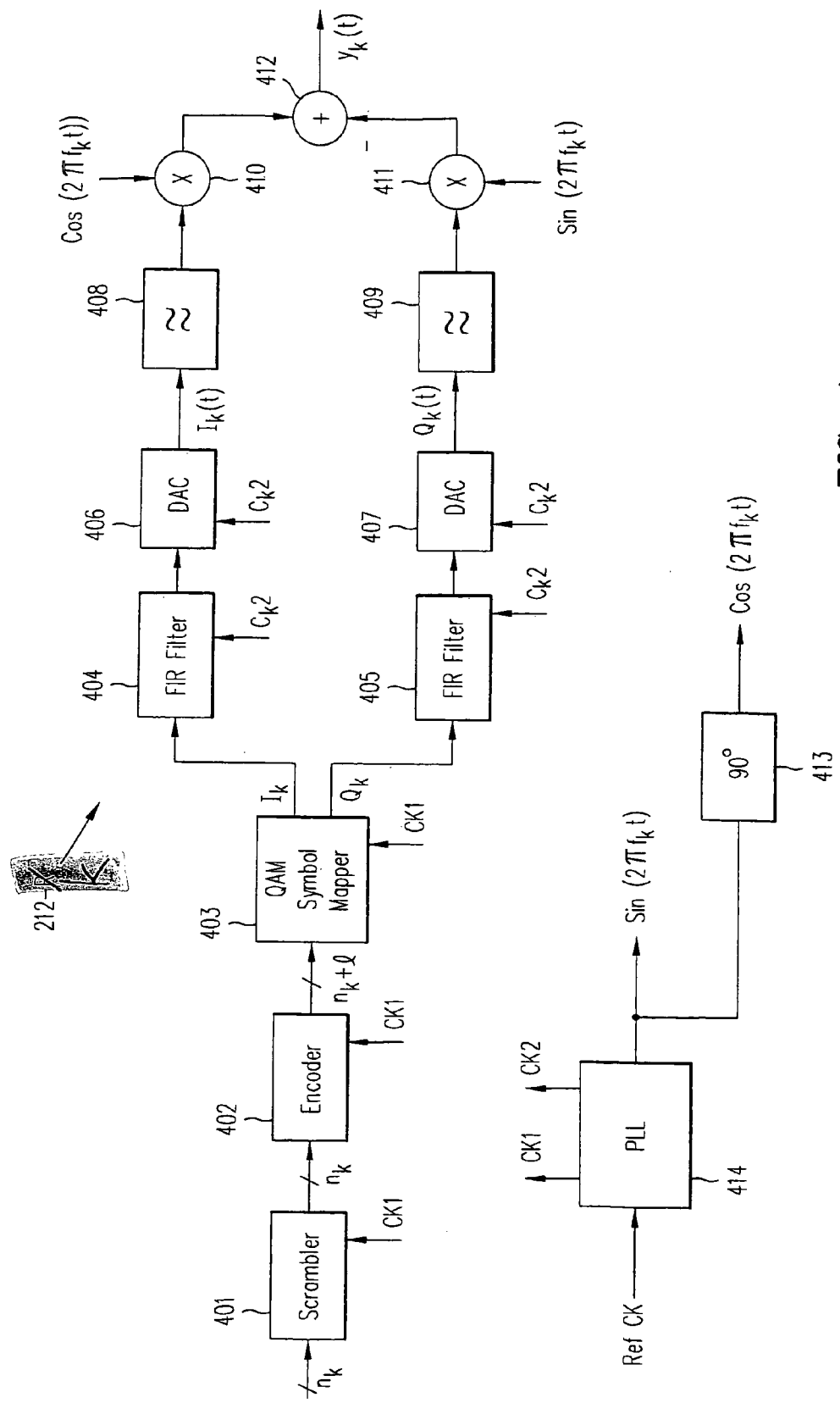
FIG. 4 shows a block diagram of an embodiment of a transmission modulator according to the present invention.

FIG. 4 shows an embodiment of modulator 212-k, an arbitrary one of modulators 212-1 through 212-K. Modulator 212-k receives $n_k$ bits per baud interval, $1/B_k$, for transmission into sub-channel 301-k. The $n_k$ bits are received in scrambler 401. Scrambler 401 scrambles the $n_k$ bits and outputs a scrambled signal of $n_k$ bits, which "whitens" the data.

The output signal of $n_k$ parallel bits is then input to encoder 402. Although any encoding scheme can be utilized, encoder 402 can be a trellis encoder for the purpose of providing error correction capabilities. Trellis coding allows for redundancy in data transmission without increase of baud rate, or channel bandwidth. Trellis coding is further discussed in, for example, BERNARD SKLAR, DIGITAL COMMUNICATIONS, FUNDAMENTALS AND APPLICATIONS (Prentice-Hall, Inc.,1988), G. Ungerboeck., "Trellis Coding Modulation with Redundant Signal Sets, Part I. Introduction," IEEE Communications Magazine, vol. 25, no. 2, February 1987, pp. 5–11, and G. Ungerboeck., "Trellis Coding Modulation with Redundant Signal Sets, Part II. State of the Art," IEEE Communications Magazine, vol. 25, no. 2, February 1987, pp. 12–21. Other encoding schemes include block coding schemes such as Reed-Solomon encoders, and BCH encoders, see, e.g., G. C. CLARK, JR., AND J. B. CAIN., ERROR CORRECTION CODING FOR DIGITAL COMMUNICATIONS (Plenum Press, New York, 1981), however they result in an increase of channel bandwidth usage. Typically, the signal output from encoder 402 includes more bits than $n_k$, $n_k$+1e. In some embodiments, encoder 402 can be a trellis encoder which adds one additional bit, in other words encoder 402 can be a rate $n_k/n_k$+1 encoder, see, e.g., G. Ungerboeck., "Trellis Coding Modulation with Redundant Signal Sets, Part I. Introduction," IEEE Communications Magazine, vol. 25, no. 2, February 1987, pp. 5–11, and G. Ungerboeck., "Trellis Coding Modulation with Redundant Signal Sets, Part II. State of the Art," IEEE Communications Magazine, vol. 25, no. 2, February 1987, pp. 12–21. In some embodiments, additional bits can be added to insure a minimum rate of transitions so that timing recovery can be efficiently accomplished at receiver 220-p.

Figure 6A:
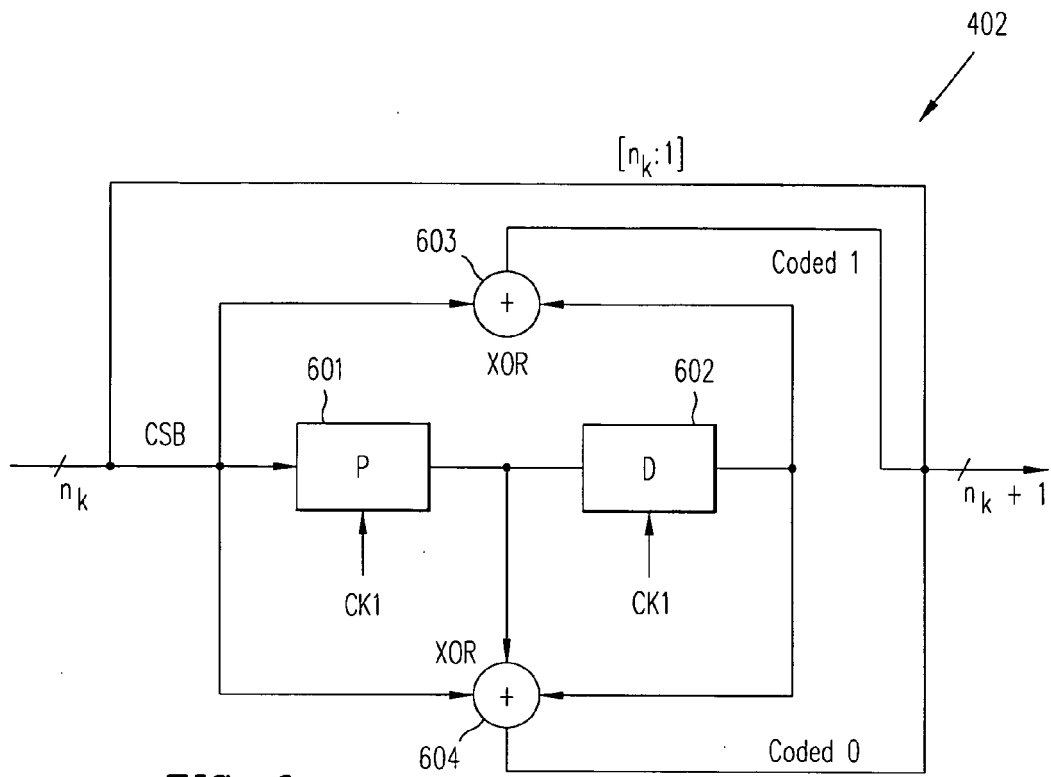
FIG. 6a shows a schematic diagram of a trellis encoder according to the present invention.

FIG. 6a shows an embodiment of encoder 402. Encoder 402 of FIG. 6a is an $n_k/n_k$+1 trellis encoder. Encoder 402 of FIG. 6a performs a ½ convolutional coding on the least-significant-bit (LSB) of the $n_k$ bit input signal. The LSB is input to delay 601. The output signal from delay 601 is input to delay 602. The LSB and the output signal from delay 602 are input to XOR adder 603. The output from XOR adder 603 provides a coded bit. The LSB, the output signal from delay 601, and the output signal from delay 602 are XORed in adder 604 to provide another coded bit. The two coded bits are joined with the remaining $n_k$–1 bits to form a $n_k$+1 bit output signal. Delays 601 and 602 are each clocked at the symbol baud rate B. One skilled in the art will recognize that other embodiments of encoder 402 can be utilized with embodiments of this invention.

In transmitter 212-k of FIG. 4, the output signal from encoder 402 is input to symbol mapper 403. Symbol mapper 403 can include any symbol mapping scheme for mapping the parallel bit signal from encoder 402 onto symbol values for transmission. In some embodiments, symbol mapper 403 is a QAM mapper which maps the ($n_k$+1e) bits from encoder 402 onto a symbol set with at least $2^{(n_k+1e)}$ symbols. A trellis encoder in conjunction with a QAM mapper can provide a trellis encoded QAM modulation for sub-channel 301-k.

Figure 6B:
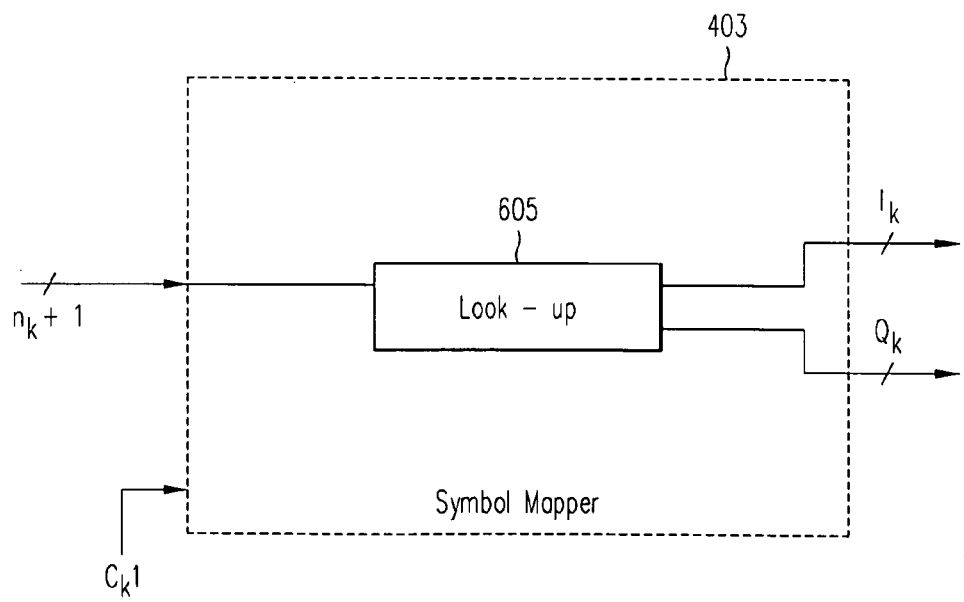
FIG. 6b shows a schematic diagram of a 256-constellation QAM mapping according to the present invention.

FIG. 6b shows an embodiment of symbol mapper 403. Symbol mapper 403 receives the $n_k$+1 data bits from encoder 402 and generates a symbol which can include an in-phase component $I_k$ and a quadrature component $Q_k$. In some embodiments, symbol mapper 403 includes a look-up table 605 which maps the $n_k$+1 input bits to the complex output symbol represented by $I_k$ and $Q_k$.

Table I shows an example symbol look-up table for conversion of an 8-bit data signal into a 256-symbol QAM scheme. Table entries are in decimal format with the in-phase values along the bottom row and the quadrature values represented along the last column. From Table I, a decimal 79 value, for example, results in an I value of –5 and a Q value of +1.

The output signal from symbol mapper 403 can be a complex signal represented by in-phase signal $I_k(n)$ and a quadrature signal $Q_k(n)$, where n represents the nth clock cycle of the clock signal CK1, whose frequency equals the baud rate $B_k$. Each of signals $I_k(n)$ and $Q_k(n)$ are digital signals representing the values of the symbols they represent. In some embodiments, a QAM mapper onto a constellation with 256 symbols can be utilized. An embodiment of a 256-symbol QAM constellation is shown in Table I. Other constellations and mappings are well known to those skilled in the art, see, e.g., BERNARD SKLAR, DIGITAL COMMUNICATIONS, FUNDAMENTALS AND APPLICATIONS (Prentice-Hall, Inc.,1988) and E. A. LEE AND D. G. MESSERSCHMITT, DIGITAL COMMUNICATIONS (Kluwer Academic Publishers, 1988). The number of distinct combinations of $I_k(n)$ and $Q_k(n)$, then, represents the number of symbols in the symbol set of the QAM mapping and their values represents the constellation of the QAM mapping.

The signals from symbol mapper 403, $I_k(n)$ and $Q_k(n)$, are input to filters 404 and 405, respectively. In some embodiments, filters 404 and 405 are finite impulse response (FIR) filters whose impulse response approximates the square-root raised-cosine shaping filter with excess bandwidth $\alpha_k$ ($0<\alpha_k<1$), as described, for example, in BERNARD SKLAR, DIGITAL COMMUNICATIONS, FUNDAMENTALS AND APPLICATIONS (Prentice-Hall, Inc.,1988). In some embodiments, $\alpha_k$ can be made as small as possible so that efficient utilization of the available bandwidth is realized. In those embodiments, the continuous time-domain impulse response of the square-root raised-cosine pulse of filters 404 and 405 is given by $$h(t) = \frac{\sin\{\pi(1-\alpha_k)tB_k\} + 4\alpha_k B_k t\cos(\pi(1+\alpha_k)tB_k)}{\pi B_k t[1-(4\alpha_k B_k t)^2]}, \quad (2)$$

where $B_k$ is the symbol baud rate of transmission channel 301-k, $\alpha_k$ is the excess bandwidths of filters 404 and 405 of modulator 212-k. In some embodiments, filters 404 and 405 operate at a multiple of the clock frequency CK1 so that each symbol output from symbol mapper 403 is sampled a multiple number of times by filters 404 and 405, at a clock rate of clock signal CK2. Timing block 414 receives the reference clock signal from PLL 203 and generates clock signals CK1 and CK2. Clock signal CK2 can be utilized in filters 404 and 405. In some embodiments, filters 404 and 405 operate at twice the symbol rate, 2B. In embodiments where filters 404 and 405 are a FIR filter with a transport function given by Equation (2), then the coefficients of FIR filters 404 and 405 can be given by $$L_j = h(j/2B_k); -\lambda \leq j \leq \lambda, \quad (3)$$

for an FIR filter of length ($2\lambda+1$), whose output samples are at twice the baud rate $B_k$ (i.e., CK2 has a frequency twice the baud rate $B_k$)

The output signals from filters 404 and 405 are input to digital-to-analog converters (DACs) 406 and 407, respectively. DACs 406 and 407 operate at the same rate as filters 404 and 405. In some embodiments, therefore, DACs 406 and 407 are clocked (with signal CK2) at twice the symbol rate, which is twice the transmission clock frequency $B_k$.

The analog output signals from DACs 406 and 407, represented by $I_k(t)$ and $Q_k(t)$, respectively, can be input to low-pass filters 408 and 409, respectively. The output signals from low-pass filters 408 and 409, designated $I_k^{LPF}(t)$ and $Q_k^{LPF}(t)$, respectively, are then up-converted to a center frequency $f_k$ to generate the output signal of $y_k(t)$, the kth channel signal. The output signal from low-pass filter 408, $I_k^{LPF}(t)$, is multiplied by $\cos(2\pi f_k t)$ in multiplier 410. The output signal from low-pass filter 409, $Q_k^{LPF}(t)$, is multiplied by $\sin(2\pi f_k t)$ in multiplier 411. The signal $\sin(2\pi f_k t)$ can be generated by PLL 414 based on the reference clock signal and the signal $\cos(2\pi f_k t)$ can be generated by a $\pi/2$ phase shifter 413.

The output signals from multipliers 410 and 411 are summed in summer 412 to form $$y_k(t) = I_k^{LPF}(t)\cos(2\pi f_k t) - Q_k^{LPF}(t)\sin(2\pi f_k t). \quad (4)$$

The overall output of transmitter 210-p (FIG. 2B), the output from summer 213, is then given by $$z(t) = \sum_{k=1}^{K} y_k(t). \quad (5)$$

In some embodiments, the center frequencies of channels 301-1 through 301-K, frequencies $f_1$ through $f_K$, respectively, can be chosen by $$f_k = B_k(1+\alpha_k)(k-0.5); 1 \leq k \leq K. \quad (6)$$

In some embodiments, other center frequencies can be chosen, for example:

$$f_1 \geq 0.5 B_k(1+\alpha_k)$$

$$(f_k - f_{k-1}) \geq B_k(1+\alpha_k); k \geq 2. \quad (7)$$

In general, the center frequencies of channels 301-1 through 301-K can be any separated set of frequencies which substantially separate (i.e., minimizing overlap between channels) in frequency the transmission bands of transmission channels 301-1 through 301-K.

In some embodiments of the invention, DACs 406 and 407 may be moved to receive the output of summer 412. Further, in some embodiments DACs 406 and 407 can be replaced by a single DAC to receive the output of summer 213. However, such DACs should have very high sampling rates.

As an example, then, an embodiment of transmitter 210-p capable of 10 Gbps transmission can be formed. In that case, $\eta=10$, i.e., an overall throughput of 10 Gbps from the transmitter to the receiver. The embodiment, for example, can have K=8 channels 301-1 through 301-8, with the baud rate on each channel B being 156.25 times (7/8). In other words, $n_k=7$; $1 \leq k \leq 8$ and encoder 402 is a 7/8 rate trellis encoder. Therefore, symbol mapper 403 can be a QAM symbol mapper with a 256-symbol constellation with baud rate B. The baud rate B, then, is the same on all eight sub-channels 301-1 through 301-8. In some embodiments, DACs 406 and 407 are each 10 bit DACs. A schematic diagram of an embodiment of trellis encoder 402 and an embodiment of the resultant 256-QAM constellation mapping are shown in FIGS. 6A and 6B, respectively. An example of a 256 symbol QAM mapping table is shown as Table I. The above described trellis encoder 402, in this embodiment, provides an asymptotic coding gain of about 3 dB over uncoded 128-QAM modulation with the same data rate, see, e.g., G. Ungerboeck., "Trellis Coding Modulation with Redundant Signal Sets, Part I. Introduction," IEEE Communications Magazine, vol. 25, no. 2, February 1987, pp. 5–11, and G. Ungerboeck., "Trellis Coding Modulation with Redundant Signal Sets, Part II. State of the Art," IEEE Communications Magazine, vol. 25, no. 2, February 1987, pp. 12–21.

Figure 5:
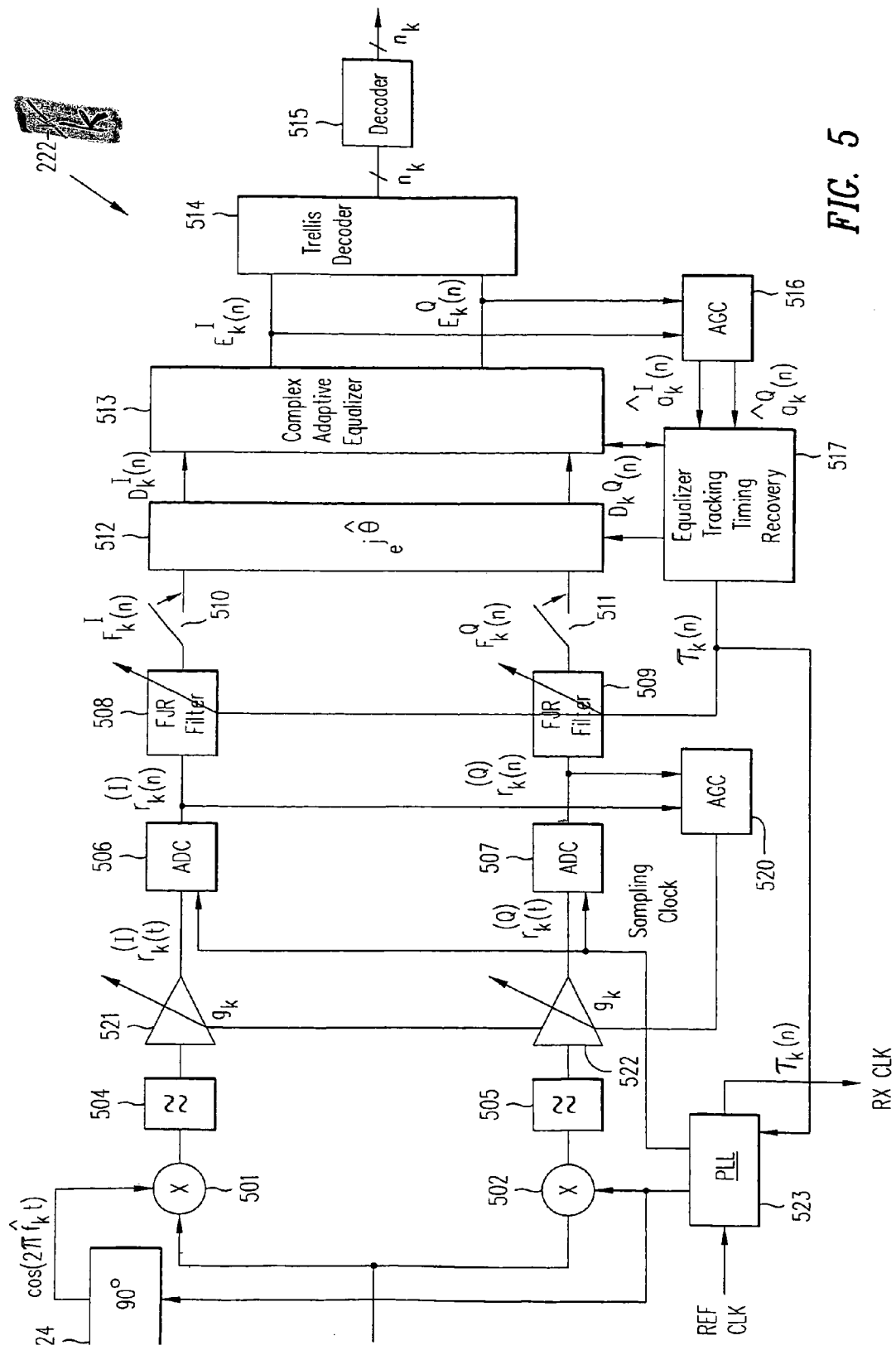
FIG. 5 shows a block diagram of an embodiment of a receiver demodulator according to the present invention.

FIG. 5 shows a block diagram of demodulator 222-k of receiver 220-p, where receiver 220-p is an arbitrary one of receivers 220-1 through 220-P of system 200 and demodulator 222-k is an arbitrary one of demodulators 222-1 through 222-K. As shown in FIG. 2C, the output signals from receiver input buffer 224, Z(t), is received in each of demodulators 222-1 through 222-K. Therefore, in FIG. 5, demodulator 222-k receives input signal Z(t).

Signal Z(t) is received in multipliers 501 and 502 where it is down-converted to baseband to obtain an in-phase component $r_k^I(t)$ and a quadrature component $r_k^Q(t)$. Multiplier 501 multiplies signal Z(t) with $\cos(2\pi \hat{f}_k t)$ and multiplier 502 multiplies signal Z(t) with $\sin(2\pi \hat{f}_k t)$, where $\hat{f}_k$ can be the locally generated estimate of the carrier center frequency $f_k$ from the corresponding transmission modulator 210-k. The clock signals within component 201-p, an arbitrary one of components 201-1 through 201-P, which are generated based on the reference signal from PLL 230 as shown in FIG. 2A, will have the same frequencies. However, the frequencies between differing ones of components 201-1 through 201-P can be slightly different. Therefore, $\{f_k\}$ denotes the set of frequencies at the transmitter and $\{\hat{f}_k\}$ denotes the set of frequencies at the receiver.

As shown in FIG. 5, PLL 523 generates the clock signals for receiver 222-k and also generates the $\sin(2\pi \hat{f}_k t)$ signal. The $\cos(2\pi \hat{f}_k t)$ signal can be generated by $\pi/2$ phase shifter 524. PLL 523 generates the sampling clock signal utilized in ADCs 506 and 507 as well as AGC 520 based on the reference clock signal. PLL 523 also generates an RX CLK signal for output with the $n_k$ bit output signal from receiver 222-k. PLL 523 can be a free-running loop generating clock signals for receiver 222-k based on the reference clock signal. In some embodiments modulator 212-k of the transmitter and demodulator 222-k of the receiver, because they are part of different ones of components 201-1 through 201-P, are running off different clock signals. This means that the digital PLLs for timing recovery and carrier recovery correct both phase and frequency offsets between the transmitter clock signals and receiver clock signals.

The output signals from multipliers 501 and 502 are input to low-pass filters 504 and 505. Low-pass filters 504 and 505 are anti-aliasing filters. The output signals from low-pass filters 504 and 505 can, in some embodiments, be amplified in variable gain amplifiers 521 and 522, respectively. The output signals from low-pass filters 504 and 505, then, are $$r_k^I(t) = LPF[Z(t)\cos(2\pi f_k t)]g_k$$

$$r_k^Q(t) = LPF[Z(t)\sin(2\pi f_k t)]g_k, \quad (8)$$

where $g_k$ represents the gain of amplifiers 521 and 522.

Signals $r_k^I(t)$ and $r_k^Q(t)$ are input to analog-to-digital converters (ADC) 506 and 507, respectively. In some embodiments, ADCs 506 and 507 operate at a sampling rate higher than the transmission symbol rate, e.g. 2 times the QAM symbol rate. The timing clock signal, as well as the sin and cos functions of Equation (8), is determined by PLL 523. In outputs with $\eta=10$, K=8, and $n_k=7$, as described above, ADCs 506 and 507 can operate at a rate of 2* 156.25(8/7) Msps.

Figure 8:
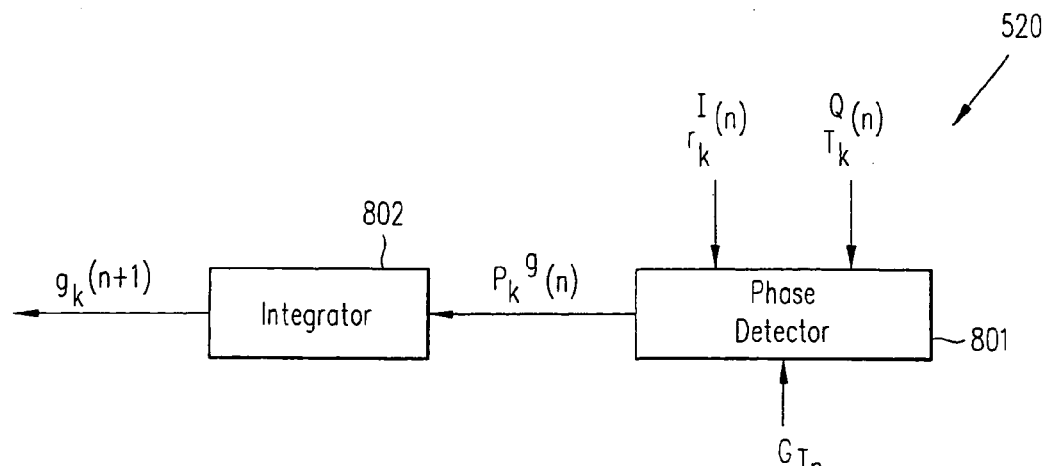
FIG. 8 shows a block diagram of an embodiment of an automatic gain control circuit of a receiver demodulator according to the present invention.

In some embodiments, the gain of amplifiers 521 and 522 can be set by automatic gain control circuit (AGC) 520. Gain control circuit 520 can receive the digital output signals from ADCs 506 and 507, $r_k^I(n)$ and $r_k^Q(n)$, respectively, and determines the gain $g_k(n+1)$. FIG. 8 shows an embodiment of AGC 520, which includes an AGC phase detector 801 and an integrator 802. Phase detector 801 estimates whether or not the mean-squared-power of signals $r_k^I(t)$ $r_k^Q$ and (t) is at a pre-determined threshold value and, if not, provides a correction signal to adjust the amplitudes of signals $r_k^I(t)$ and $r_k^Q(t)$. The output signal from phase detector 801 can be given by $$p_k^g(n) = [G_{th} - (r_k^I(n)^2 + r_k^Q(n)^2)], \quad (9)$$

where $G_{th}$ is the mean squared power of the signals input to ADCs 506 and 507 once AGC 520 converges. The output signal from phase detector 801, $p_k^g(n)$ is then input to integrator 802. Integrator 802 digitally adjusts the gain $g_k$ according to $$g_k(n+1) = g_k(n) + \alpha_g p_k^g(n), \quad (10)$$

where $\alpha_g$ determines the rate of adaptation of the AGC algorithm. The constant $\alpha_g$ can be chosen to be a negative power of 2 for ease of implementation and also can be chosen such that the overall 3-dB bandwidth of AGC 520 is around 0.5% of the baud rate on the kth channel, channel 301-k.

In receiver 222-k of FIG. 5, the digital output signals from ADCs 506 and 507, $r_k^I(n)$ and $r_k^Q(n)$, respectively, are input to FIR filters 508 and 509. In some embodiments, FIR filters 508 and 509 are interpolating matched filters which also provide sampling phase and frequency offset correction. In some embodiments, the frequency response of matched filters 508 and 509 is that of a square-root raised cosine signal shaping, as is described in Equation (2) above. The actual coefficients of matched FIR filters 508 and 509, then, are a function of the timing recovery algorithm in block 517. Since ADCs 506 and 507 operate at twice the symbol rate $B_k$, FIR filters 508 and 509 also operate at twice the symbol rate $B_k$. In some embodiment, the output signal from FIR filters 508 and 509 is at the symbol rate $B_k$.

In some embodiments of the invention, FIR filters 508 and 509 each execute a filter having coefficients given by $$L_{j,k}^{RX} = h\left(\frac{j}{2B} + \frac{\hat{\tau}_k(n)}{2B}\right); -\lambda \leq j \leq \lambda, \quad (11)$$

where $2\lambda+1$ is the FIR filter length of transmit filters 404 and 405 of transmit modulator 210-k and $\hat{\tau}_k(n)$ is the timing recovery parameter calculated by tracking and timing recovery 517. The output signals from FIR filters 508 and 509 are down-converted by down-converters 510 and 511 respectively, to the symbol rate $B_k$.

The output signals from down-converters 510 and 511, $F_k^I(n)$ and $F_k^Q(n)$, respectively, are then input to a phase rotation circuit 512. Phase rotation 512 rotates signals $F_k^I(n)$ and $F_k^Q(n)$ according to the output of a carrier phase and frequency offset correction circuit, which depends on the difference between $\hat{f}_k$ and $f_k$, and the correction phase locked loop, $\theta$. The rotation angle $\hat{\theta}_k(n)$ is computed in carrier tracking and timing recovery block 517. The resultant output signals of carrier phase rotation circuit 512, $D_k^I(n)$ and $D_k^Q(n)$, are given by:

$$D_k^I(n) = F_k^I(n)\cos(\hat{\theta}_k(n)) + F_k^Q(n)\sin(\hat{\theta}_k(n))$$

$$D_k^Q(n) = F_k^Q(n)\cos(\hat{\theta}_k(n)) - F_k^I(n)\sin(\hat{\theta}_k(n)). \quad (12)$$

The output signals from rotation circuit 512, $D_k^I(n)$ and $D_k^Q(n)$, are then input to a complex adaptive equalizer 513 to counter the intersymbol interference caused by frequency dependent channel attenuation, and the reflections due to connectors and vias that exist in communication system 200 (which can be a backplane communication system, an inter-cabinet communication system, or a chip-to-chip communication system).

It should be noted that because of the frequency division multiplexing of data signals, as is accomplished in transmitter 210-p and receiver 220-p, the amount of equalization needed in any one of channels 301-1 through 301-K is minimal. In some embodiments, such as the 8-channel, 7 bit per channel, 10 Gbps example, only about 3–4 dB of transmission channel magnitude distortion needs to be equalized. In other words, the number of taps required in a transport function for equalizer 513 can be minimal (e.g., 1–3 complex taps) in embodiments of the present invention, which can simplify receiver 220-p considerably. In some embodiments of the invention, equalizer 513 can have any number of taps.

In general, complex adaptive equalizer 513 can be a decision feedback equalizer (DFE) or a linear equalizer. See, e.g., EDWARD A. LEE, AND DAVID G. MESSERSCHMITT, DIGITAL COMMUNICATION, PP. 371–402 (Kluwer Academic Publishers, 1988). The in-phase and quadrature output signals from adaptive equalizer 513 in embodiments with linear equalization can be given by:

$$E_k^I(n) = \sum_{j=-M}^{N} C_k^x(n) D_k^I(n-j) - C_k^y(n) D_k^Q(n-j) \text{ and}$$

$$E_k^Q(n) = \sum_{j=-M}^{N} C_k^x(n) D_k^Q(n-j) + C_k^y(n) D_k^I(n-j).$$  (13)

The complex adaptive equalizer coefficients $C_k^x(n)$ and $C_k^y(n)$ can be updated according to the least mean squares (LMS) algorithm as described in BERNARD SKLAR, DIGITAL COMMUNICATIONS, FUNDAMENTALS AND APPLICATIONS (Prentice-Hall, Inc.,1988), for example.

The coefficients are updated in tracking and timing recovery block 517, for example, according to the following update equations:

$$C_k^x(n+1) = C_k^x(n) - \mu[e_k^I(n) D_k^I(n) + e_k^Q(n)]$$

$$C_k^y(n+1) = C_k^y(n) - \mu[e_k^Q(n) D_k^I(n) - e_k^Q(n)],$$  (14)

where $\mu$ is the constant that determines the rate of adaptation of the coefficients, and $e_k^I(n)$ and $e_k^Q(n)$ are estimated error values. The constant $\mu$ is chosen to control the rate of adaptation, and, in some embodiments, is in the range of $2^{-8}$ to $2^{-14}$. The estimated error values can be computed according to:

$$e_k^I(n) = E_k^I(n) - \hat{\alpha}_k^I(n) \text{ and}$$

$$e_k^Q(n) = E_k^Q(n) - \hat{\alpha}_k^Q(n),$$  (15)

where $\{\hat{\alpha}_k^I(n), \hat{\alpha}_k^Q(n)\}$ is the decision set based on the sample set $\{E_k^I(n), E_k^Q(n)\}$, and represents the closest QAM symbol in Euclidean distance to the sample set. See, e.g., EDWARD A. LEE, AND DAVID G. MESSERSCHMITT, DIGITAL COMMUNICATION, PP. 371–402 (Kluwer Academic Publishers, 1988). A decision set $\{\hat{\alpha}_k^I(n), \hat{\alpha}_k^Q(n)\}$ can be computed based on sample set $\{E_k^I(n), E_k^Q(n)\}$ in decision unit 516 and the results received into tracking and timing recovery circuit 517 where the estimated error values of Equation 15 and the resulting coefficient updates of Equation 14 are computed.

Figure 7:
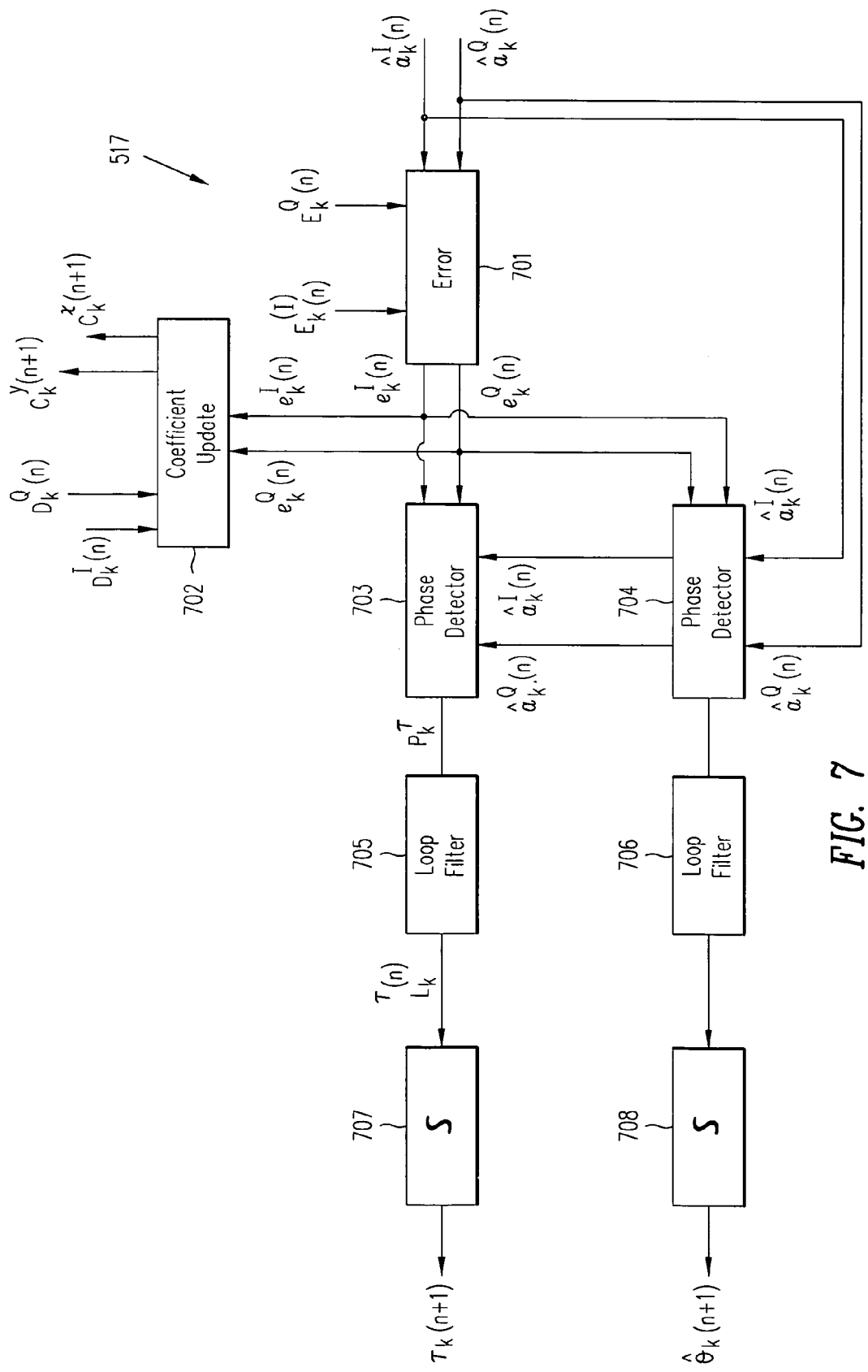
FIG. 7 shows a block diagram of an embodiment of a tracking and error-recovery circuit of the receiver shown in FIG. 5.

FIG. 7 shows a block diagram of equalizer coefficient update, carrier tracking and timing recovery block 517. Block 517 includes error calculation block 701 and coefficient update block 702. Error calculation block 701 receives decisions $\hat{\alpha}_k^I(n)$ and $\hat{\alpha}_k^Q(n)$ from decision unit 516 as well as sample set signals $E_k^I(n)$ and $E_k^Q(n)$ from complex adaptive equalizer 513 and calculates errors $e_k^I(n)$ and $e_k^Q(n)$ according to Equation 14. Coefficient update 702 receives errors $e_k^I(n)$ and $e_k^Q(n)$ from error calculation block 701 and also receives signals $D_k^I(n)$ and $D_k^Q(n)$ from de-rotator 512 and calculates updated equalizer coefficients for complex adaptive equalizer 513 according to Equation 13.

Tracking and timing recovery circuit 517 can also include a carrier recovery loop for controlling carrier phase rotation circuit 512 and a timing recovery loop for controlling interpolating FIR filters 508 and 509. In some embodiments, the timing recovery loop for determining $\tau_k(n+1)$ for FIR filters 508 and 509 in tracking and timing recovery 517 can be implemented as a $2^{nd}$ order digital phase locked loop as shown in FIG. 7.

The errors $e_k^I(n)$ and $e_k^Q(n)$ from error calculation block 701 and the decisions $\hat{\alpha}_k^I(n)$ and $\hat{\alpha}_k^Q(n)$ from decision unit 516 are input to phase detector 703. Phase detector 703 produces an estimate of the phase error $P_k^\tau$, in some embodiments according to the following equation:

$$P_k^\tau(n) = [e_k^I(n-1)\hat{\alpha}_k^I(n) - e_k^I(n)\hat{\alpha}_k^I(n-1)] + [e_k^Q(n-1) \hat{\alpha}_k^Q(n) - e_k^Q(n)\hat{\alpha}_k^Q(n-1)]$$  (16)

The output signal from phase detector 703, $p_k^\tau$, can then be input to a $2^{nd}$ order loop filter, which in some embodiments can have a transfer function given by $$L(z) = \alpha_\tau + \beta_\tau \frac{z^{-1}}{1-z^{-1}}$$  (17)

where $\alpha_\tau$ and $\beta_\tau$ are the loop filter coefficients that determine the timing recovery loop bandwidth and damping factor, respectively. The values of $\alpha_\tau$ and $\beta_\tau$ determine the carrier tracking loop bandwidth and damping factors. In some embodiments, a loop bandwidth equal to 1% of baud rate, and damping factor equal to 1 can be implemented. The loop bandwidth and damping factors can depend not only on loop filter coefficients, but also on phase detector slope, and the digital integrator gain. Thus, the output signal $L_k^\tau(n)$ from loop filter 705 is given by $$L_k^\tau(n) = \alpha_\tau p_k^\tau(n) + I_k^\tau(n), \text{ where}$$

$$I_k^\tau(n) = I_k^\tau(n-1) + \beta_\tau p_k^\tau(n-1).$$  (18)

The output signal from loop filter 705, $L_k^\tau(n)$, is then input to a digitally implemented integrator 707, the output of which is the phase correction $\hat{\tau}_k(n)$ given by $$\hat{\tau}_k(n+1) = \hat{\tau}_k(n) + L_k^\tau(n).$$  (19)

The phase correction $\hat{\tau}_k(n)$ is then received by FIR filters 508 and 509, as described above.

The carrier phase recovery loop which computes the parameter $\hat{\theta}$ utilized in phase rotation 517 can also be implemented as a $2^{nd}$ order digital phase locked loop as shown in FIG. 7. Phase detector 704 receives decision values $\{\hat{\alpha}_k^I(n), \hat{\alpha}_k^Q(n)\}$ from decision unit 516 and error signals $\{e_k^I(n), e_k^Q(n)\}$ from error calculation 701, and produces an estimate of the phase error. In some embodiments, the estimate of the phase error $p_k^\theta(n)$ performed by phase detector 704 can be given by:

$$p_k^\theta(n) = \left[e_k^Q(n)\text{sign}\{\hat{a}_k^I(n)\} - e_k^I(n)\text{sign}\{\hat{a}_k^Q(n)\}\right], \text{ where} \quad (20)$$

$$\text{sign}(x) = \begin{cases} 1 & \text{if } x \geq 0 \\ -1 & \text{if } x < 0 \end{cases}. \quad (21)$$

The output signal from phase detector 704 can be input to a $2^{nd}$ order loop filter 706 with a transfer function given by $$L(z) = \alpha_\theta + \beta_\theta \frac{z^{-1}}{1-z^{-1}}, \quad (22)$$

where $\alpha_\theta$ and $\beta_\theta$ are the loop filter coefficients that determine the timing recovery loop bandwidth and the damping factor and can be determined as described above with Equation 17. Thus, the output signal from loop filter 706 is given by $$L_k^\theta(n) = \alpha_\theta p_k^\theta(n) + I_k^\theta(n), \text{ where}$$

$$I_k^\theta(n) = I_k^\theta(n-1) + \beta_\theta p_k^\theta(n-1). \quad (23)$$

The output signal from loop filter 706 is then input to a digitally implemented integrator 708. The output signal from integrator 708, $\hat{\theta}_k(n+1)$, is then given by $$\hat{\theta}_k(n+1) = \hat{\theta}_k(n) + L_k^\theta(n). \quad (24)$$

The carrier tracking loop output signal $\hat{\theta}_k(n)$, output from integrator 708, is then input to phase rotation circuit 512.

As shown in FIG. 5, the output signals from complex adaptive equalizer 513, equalized samples $\{E_k^I(n), E_k^Q(n)\}$, are input to trellis decoder 514. Trellis decoding can be performed using the Viterbi algorithm, see, e.g., G. Ungerboeck., "Channel Coding with Multilevel/Phase Signals," IEEE Transactions on Information Theory, vol. IT-28, January 1982, pp. 55–67, G. Ungerboeck., "Trellis Coding Modulation with Redundant Signal Sets, Part I. Introduction," IEEE Communications Magazine, vol. 25, no. 2, February 1987, pp. 5–111, G. Ungerboeck., "Trellis Coding Modulation with Redundant Signal Sets, Part II. State of the Art," IEEE Communications Magazine, vol. 25, no. 2, February 1987, pp. 12–21, or G. C. CLARK, JR., AND J. B. CAIN, ERROR CORRECTION CODING FOR DIGITAL COMMUNICATIONS, PP.253–264(Plenum Press, New York, 1981). Additionally, trellis decoder 514 converts from the QAM symbol set back to parallel bits.

The output signal from trellis decoder 514, which now contains $n_k$ parallel bits, is in put to descrambler 515. Descrambler 515 of receiver demodulator 222-k operates to reverse the scrambling operation of scrambler 401 of transmitter modulator 212-k.

As is shown in FIG. 2C, the output signals from each of demodulators 222-1 through 222-K are recombined into an N-bit parallel signal in bit parsing 221. Additionally, the RX clock signal is output from bit parsing 221.

Figure 9:
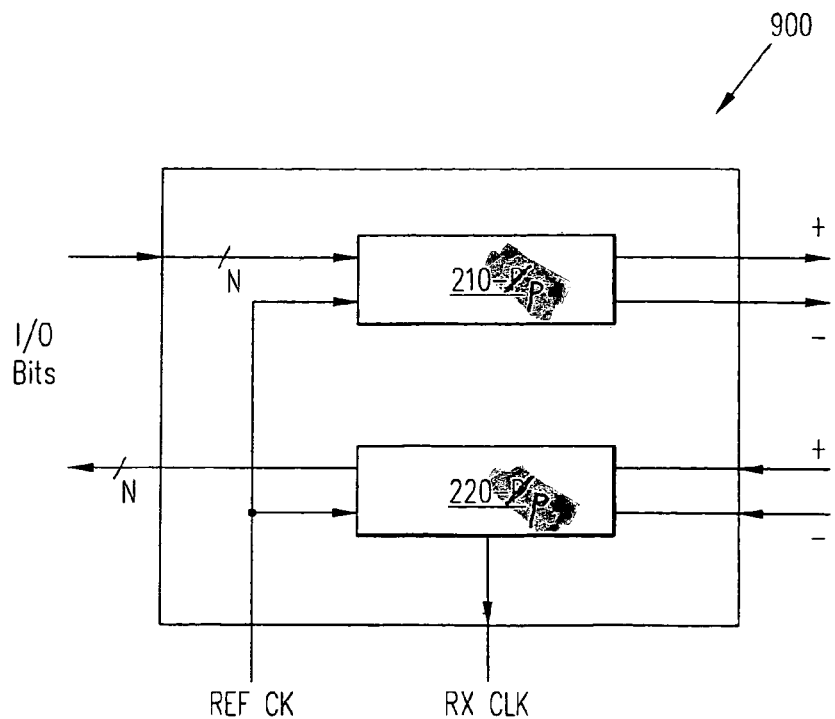
FIG. 9 shows a block diagram of a transceiver chip according to the present invention.

FIG. 9 shows a transceiver chip 900 according to the present invention. Transceiver chip 900 includes transmitter 210-p and receiver 220-p formed on a single semiconductor chip. In some embodiments, transceiver chip 900 is formed in silicon using CMOS technology. Transceiver chip 900 can receive N bits into transmitter 210-p and output N bits from receiver 220-p. In some embodiments, different pins may be utilized for input bits and output bits, as shown in FIG. 9. In some embodiments, transmitter 210-p and receiver 220-p share the same N pins. Transmitter 900 receives a reference clock signal and outputs a receive clock signal from receiver 220-p. Further, transceiver 220 includes output pins for transmitting and receiving differential signals. In some embodiments, transmitter 210-p and receiver 220-p share the same output pins and in some embodiments transmitter 210-p and receiver 220-p are coupled to separate output pins. In some embodiments, transceiver chip 900 may be coupled to an optical driver for optical transmission.

The embodiments of the invention described above are exemplary only and are not intended to be limiting. One skilled in the art will recognize various modifications to the embodiments disclosed that are intended to be within the scope and spirit of the present disclosure. As such, the invention is limited only by the following claims.

TABLE I

| 0 | 1 | 4 | 5 | 12 | 13 | 8 | 9 | 24 | 25 | 28 | 29 | 20 | 21 | 16 | 17 | 15 |
|---|---|---|---|----|----|----|----|----|----|----|----|----|----|----|----|----|
| 2 | 3 | 6 | 7 | 14 | 15 | 10 | 11 | 26 | 27 | 30 | 31 | 22 | 23 | 18 | 19 | 13 |
| 32 | 33 | 36 | 37 | 44 | 45 | 40 | 41 | 56 | 57 | 60 | 61 | 52 | 53 | 48 | 49 | 11 |
| 34 | 35 | 38 | 39 | 46 | 47 | 42 | 43 | 58 | 59 | 62 | 63 | 54 | 55 | 50 | 51 | 9 |
| 96 | 97 | 100 | 101 | 108 | 109 | 104 | 105 | 120 | 121 | 124 | 125 | 116 | 117 | 112 | 113 | 7 |
| 98 | 99 | 102 | 103 | 110 | 111 | 106 | 107 | 122 | 123 | 126 | 127 | 118 | 119 | 114 | 115 | 5 |
| 64 | 65 | 68 | 69 | 76 | 77 | 72 | 73 | 88 | 89 | 92 | 93 | 84 | 85 | 80 | 81 | 3 |
| 66 | 67 | 70 | 71 | 78 | 79 | 74 | 75 | 90 | 91 | 94 | 95 | 86 | 87 | 82 | 83 | 1 |
| 192 | 193 | 196 | 197 | 204 | 205 | 200 | 201 | 216 | 217 | 220 | 221 | 212 | 213 | 208 | 209 | -1 |
| 194 | 195 | 198 | 199 | 206 | 207 | 202 | 203 | 218 | 219 | 222 | 223 | 214 | 215 | 210 | 211 | -3 |
| 224 | 225 | 228 | 229 | 236 | 237 | 232 | 233 | 248 | 249 | 252 | 253 | 244 | 245 | 240 | 241 | -5 |
| 226 | 227 | 230 | 231 | 238 | 239 | 234 | 235 | 250 | 251 | 254 | 255 | 246 | 247 | 242 | 243 | -7 |
| 160 | 161 | 164 | 165 | 172 | 173 | 168 | 169 | 184 | 185 | 188 | 189 | 180 | 181 | 176 | 177 | -9 |
| 162 | 163 | 166 | 167 | 174 | 175 | 170 | 171 | 186 | 187 | 190 | 191 | 182 | 183 | 178 | 179 | -11 |
| 128 | 129 | 132 | 133 | 140 | 141 | 136 | 137 | 152 | 153 | 156 | 157 | 148 | 149 | 144 | 145 | -13 |
| 130 | 131 | 134 | 135 | 142 | 143 | 138 | 139 | 154 | 155 | 158 | 159 | 150 | 151 | 146 | 147 | -15 |
| -15 | -13 | -11 | -9 | -7 | -5 | -3 | -1 | 1 | 3 | 5 | 7 | 9 | 11 | 13 | 15 | I/Q |

I claim:

1. A serializer/deserializer communications system, comprising:

a transmitter, the transmitter coupled to receive N parallel bits of data and transmit the N parallel bits of data into K frequency separated channels on a single conducting differential transmission medium, where N and K are integers each greater than one, the N parallel bits being transmitted into the K frequency separated channels of the sterilizer/deserializer system synchronously; and a receiver coupled to receive a sum signal that includes signals from each of the K frequency separated channels from the single conducting differential transmission medium and recover the N parallel bits of data, wherein the receiver includes K demodulators, each of the K demodulators receiving signals on one of the K frequency separated channels, at least one of the K demodulators including an analog down converter that converts the signal corresponding to that channel associated with the at least one of the demodulators to a base-band signal in a single step;

an analog-to-digital converter coupled to receive the base-band signal from the analog down converter and generate a digitized base-band signal;

an equalizer circuit coupled to receive the digitized base-band signal and create an equalized symbol; and a decoder that synchronously retrieves the equalized symbol and retrieves a decoder that receives the equalized symbol and retrieves bits associated with the at least one of the K demodulators associated with the at least one of the K demodulators.

2. The system of claim 1, wherein the transmitter comprises
a bit allocation circuit that receives the N parallel bits of data and creates K subsets of data bits;
K modulators, wherein each of the K modulators encodes one of the K subsets of the N parallel bits of data and creates an output signal modulated at a carrier frequency associated with one of the K frequency separated channels; and
an adder that receives the output signal from each of the K modulators and generates a transmit sum signal for transmission on the single conducting differential transmission medium.

3. The system of claim 2, wherein at least one of the K modulators includes
a data encoder that receives the one of the K subsets of the N parallel bits of data associated with the at least one of the K modulators and outputs an encoded signal;
a symbol mapper coupled to receive the encoded signal and output a symbol; and
an analog up-converter coupled to receive symbols from the symbol mapper and generate the output signal,
wherein the analog up-converter outputs data at the carrier frequency of one of the K frequency separate channels that corresponds with the at least one of the K modulators.

4. The system of claim 3, further including a digital-to-analog converter coupled between the symbol mapper and the analog up-converter.

5. The system of claim 3, wherein the data encoder is a trellis encoder.

6. The system of claim 3, wherein the symbol mapper is a QAM symbol mapper which maps the encoded output signal into a complex symbol that includes an in-phase signal and a quadrature signal.

7. The system of claim 4, further including a digital filter coupled between the symbol mapper and the digital-to-analog converter.

8. The system of claim 4, further including a low-pass analog filter coupled between the digital-to-analog converter and the analog up-converter.

9. The system of claim 6, wherein the analog up-converter generates a first signal by multiplying the in-phase signal of the complex symbol by a sine function of the carrier frequency, generates a second signal by multiplying the out-of-phase signal of the complex symbol by a cosine function of the carrier frequency, and summing the first signal with the second signal to generate the output signal.

10. The system of claim 1, wherein the single conducting differential transmission medium is a copper backplane and the transmitter includes a differential output driver.

11. The system of claim 1, wherein the single conducting differential transmission medium includes an FR4 copper trace and the transmitter includes a differential output driver.

12. The system of claim 2, wherein a subset of bits at a lower carrier frequency contains more bits than a subset of bits associated with a higher carrier frequency.

13. The system of claim 2, wherein each of the K subsets of data bits includes the same number of data bits.

14. The system of claim 2, wherein the receiver further comprises:
a bit parsing circuit that receives each of the K subsets of data bits from the K demodulators and reconstructs the N data bits transmitted by the transmitter.

15. The system of claim 14, wherein the receiver further includes an input buffer coupled between the K demodulators and the single conducting differential transmission medium.

16. The system of claim 15, wherein the input buffer receives a differential receive sum signal that is input to the analog down converter.

17. The system of claim 1, further including an anti-aliasing filter coupled between the analog down-converter and the analog-to-digital converter.

18. The system of claim 1, further including a variable gain amplifier coupled between the down converter and the analog-to-digital converter, the variable gain amplifier being controlled by an automatic gain circuit.

19. The system of claim 1, wherein the digitized base-band signal includes an in-phase signal and a quadrature signal and the analog down-converter multiplies the sum signal by a cosine function to retrieve the in-phase signal and by a sine function to retrieve the quadrature signal.

20. The system of claim 1 further including an adaptively controlled digital filter coupled between the digital-to-analog converter and the equalizer.

21. The system of claim 20, further including a phase-rotator coupled between the adaptively controlled digital filter and the equalizer.

22. The system of claim 1, wherein the equalizer parameters are adaptively chosen.

23. A method of communicating between components over a single conducting differential transmission medium, comprising:
synchronously serializing N bits into K subsets of bits;
encoding each of the K subsets of bits to form encoded subsets of bits;
mapping each of the K encoded subsets of bits onto a symbol set to generate K symbols representing each of the K subsets of bits;
converting each of the K symbols to K analog signals;
up-converting each of the K analog signals in a single analog up-conversion step to form K up-converted signals corresponding with a set of K carrier frequencies;
summing the K up-converted signals representing each of the K subsets of bits to generate a transmit sum signal;
coupling the transmit sum signal to the single conducting differential transmission medium;

receiving a receive sum signal from the single conducting differential transmission medium, the receive sum signal being the transmit sum signal after transmission through the single conducting differential transmission medium;

down-converting the received sum signal in a single analog down-conversion step for each of the K carrier frequencies into a set of K signals at a base band frequency;

digitizing each of the set of K signals to form K digitized signals;

equalizing each of the K digitized signals to receive K equalized symbols; and decoding each of the K synchronously equalized symbols to reconstruct the K subsets of bits; and parsing K subsets of bits ; and parsing K subsets of bits into N deserialized bits.

24. The method of claim 23, wherein symbols transmitted at lower carrier frequencies represent fewer bits than symbols transmitted at higher carrier frequencies.

25. The method of claim 23, wherein encoding each of the K subsets of bits includes encoding at least one of the K subsets of bits with a trellis encoder.

26. The method of claim 23, wherein mapping each of the encoded subsets of bits includes QAM mapping.

27. The method of claim 23, further providing digital filtering prior to converting the K symbols to K analog signals.

28. The method of claim 23, further providing analog filtering of each of the K analog signals.

29. The method of claim 23, wherein receiving the receive sum signal includes receiving a differential signal from a copper backplane.

30. The method of claim 23 further including providing automatic gain conversion for each of the set of K signals prior to digitizing each of the set of K signals.

31. The method of claim 23, further including anti-aliasing filtering prior to analog-to-digital conversion.

32. The method of claim 23 further including providing adaptively controlled filtering for timing recovery.

33. The method of claim 23 wherein the K equalized symbols are complex and further providing adaptively controlled phase rotation.

34. The method of claim 23 wherein decoding the equalized symbols includes trellis decoding and QAM decoding.

35. A transceiver chip for a serializer/deserializer system, comprising:

a transmitter portion, the transmitter portion coupled to receive N parallel bits of data and transmit the N parallel bits of data into a first set of K frequency separated channels on a first single conducting differential transmission medium, the N parallel bits being transmitted into the K frequency separated channels of the serializer-deserializer system synchronously where N and K are integers each greater than one; and a receiver portion coupled to receive data from a second set of K frequency separated channels from a second single conducting differential transmission medium and recover a second N parallel bits of data, wherein the receiver portion includes, K demodulators, each of the K demodulators coupled to receive a signal from the second single conducting differential transmission medium, the signal being a transmit sum signal transmitted through the second single conducting differential transmission medium, and retrieving one of the K subsets of data bits and a bit parsing circuit that receives each of the K subsets of data bits from the K demodulators and reconstructs the N data bits transmitted by the transmitter, and wherein at least one of the K demodulators comprises an analog down-conversion circuit that receives the signal from the second single conducting differential transmission medium and generates a symbol by converting the signal at the carrier frequency appropriate for the one of the K demodulators, an analog to digital converter coupled to digitize the symbol from the analog down conversion circuit, an equalizer circuit coupled to receive the digitized symbol from the analog to digital converter and create an equalized symbol; and a decoder which receives the equalized symbol and synchronously retrieves the one of the K subsets of bits associated with the at least one of the K demodulators.

36. The chip of claim 35, wherein the first set of K frequency separated channels have substantially identical carrier frequencies with the second set of K frequency separated channels.

37. The chip of claim 35, wherein the transmitter comprises:

a bit allocation circuit that receives the N parallel bits of data and creates K subsets of data bits; and K modulators, wherein each of the K modulators encodes one of the K subsets of the N parallel bits of data and creates an output signal modulated at a carrier frequency associated with one of the first set of K frequency separated channels; and an adder that receives the output signal from each of the K modulators and generates a transmit sum signal for transmission on the first single conducting differential transmission medium.

38. The chip of claim 37, wherein at least one of the K modulators includes a data encoder that receives the one of the K subsets of the N parallel bits of data associated with the at least one of the K modulators and outputs an encoded signal;

a symbol mapper coupled to receive the encoded signal and output a symbol;

a digital to analog converter that digitizes the symbols from the symbol mapper; and an analog up-converter coupled to receive the digitized symbols from the digital to analog converter and generate the output signal, wherein the up-converter outputs data at the carrier frequency of one of the K frequency separate channels that corresponds with the at least one of the K modulators.

39. The chip of claim 38, wherein the encoder is a trellis encoder and the symbol mapper is a QAM symbol mapper.

* * * * *

UNITED STATES PATENT AND TRADEMARK OFFICE
CERTIFICATE OF CORRECTION

| | | |
|---|---|---|
| PATENT NO. | : 7,295,623 B2 | Page 1 of 7 |
| APPLICATION NO. | : 09/904432 | |
| DATED | : November 13, 2007 | |
| INVENTOR(S) | : Sreen A. Raghavan | |

Figure 1B:
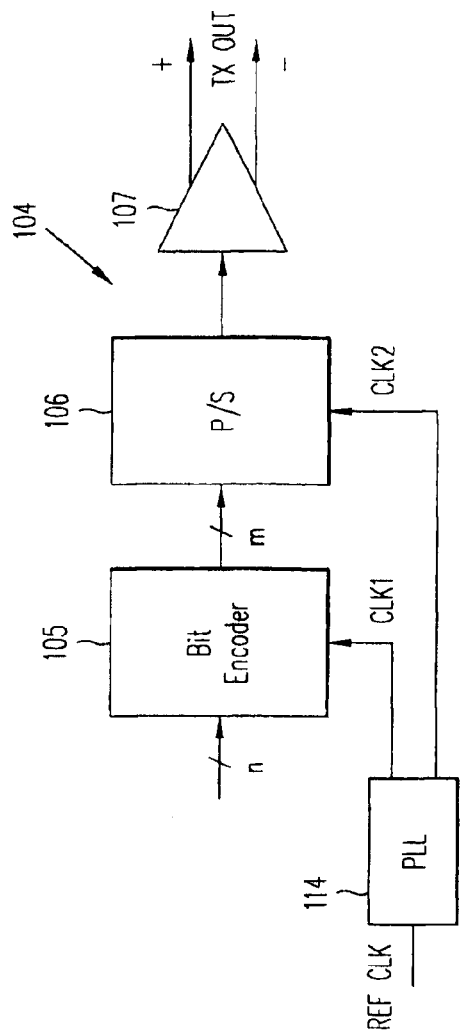
FIGS. 1A, 1B and 1C show block diagrams for a conventional system of transmitting data over a backplane.
Figure 1C:
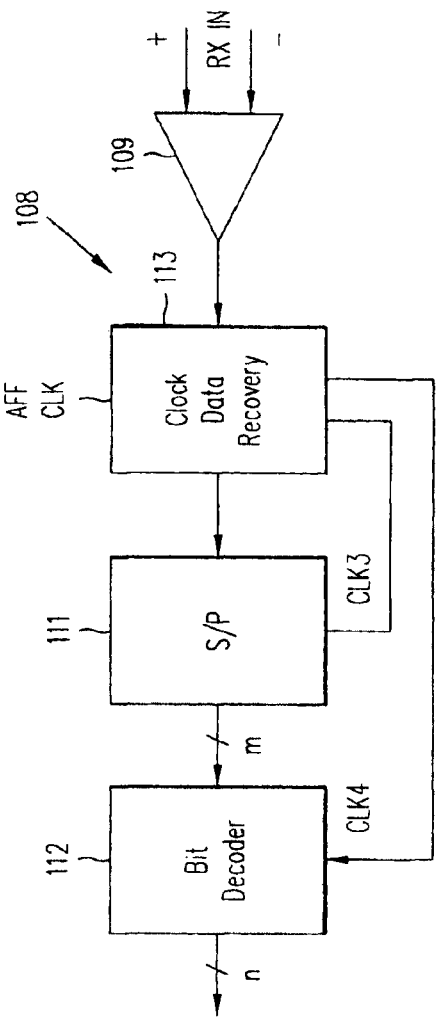
Figure 1A:
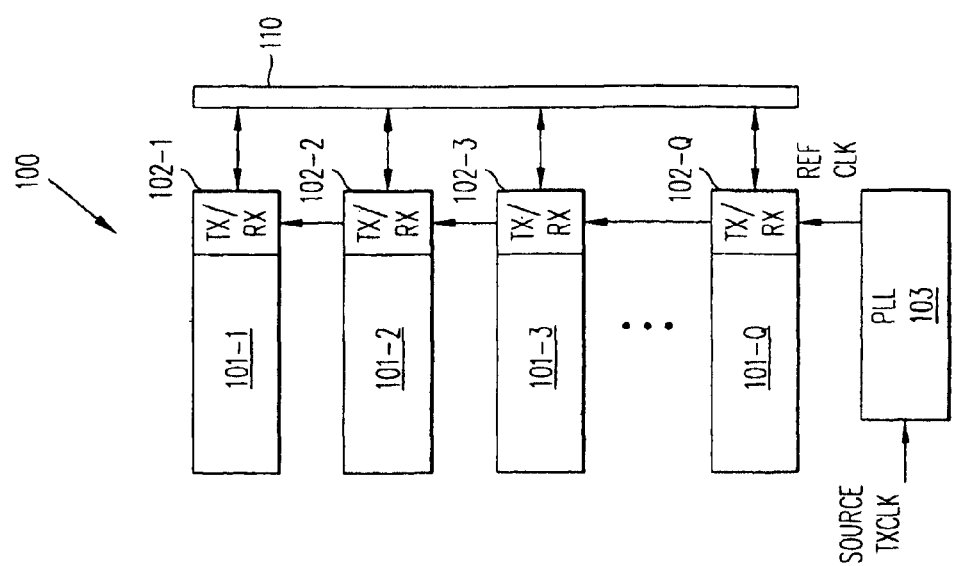
Figure 2B:
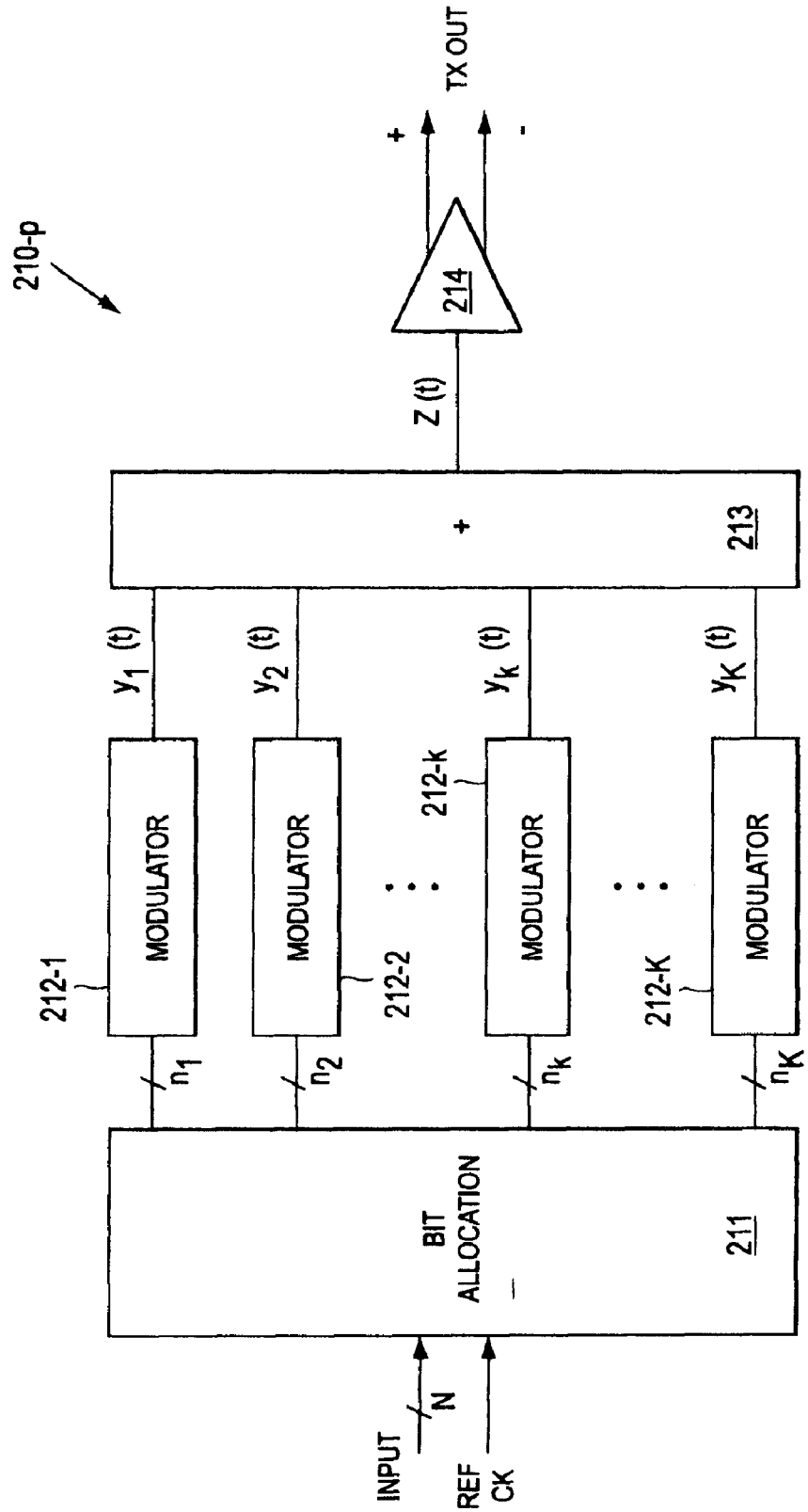
Figure 2C:
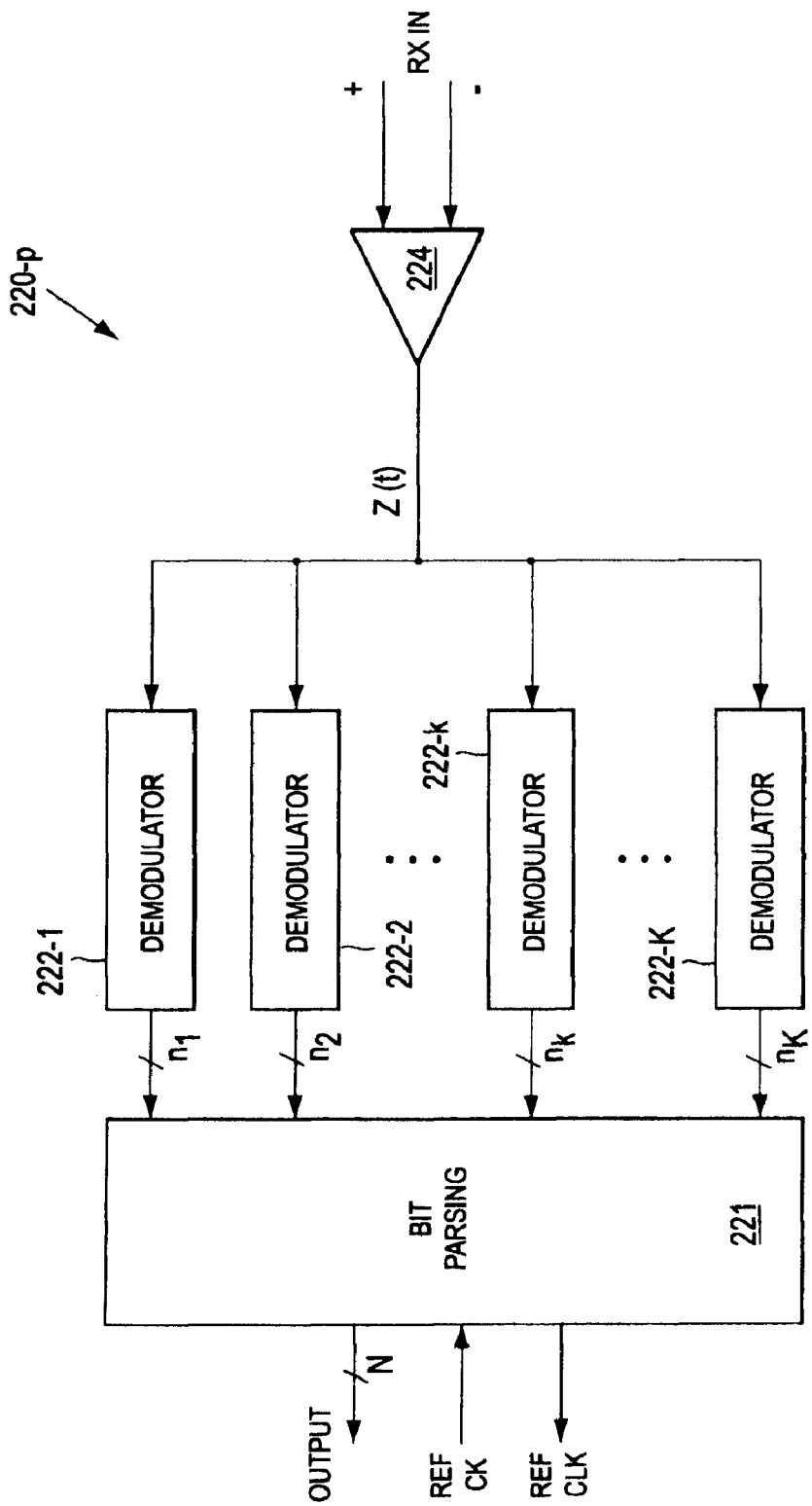
Figure 4:
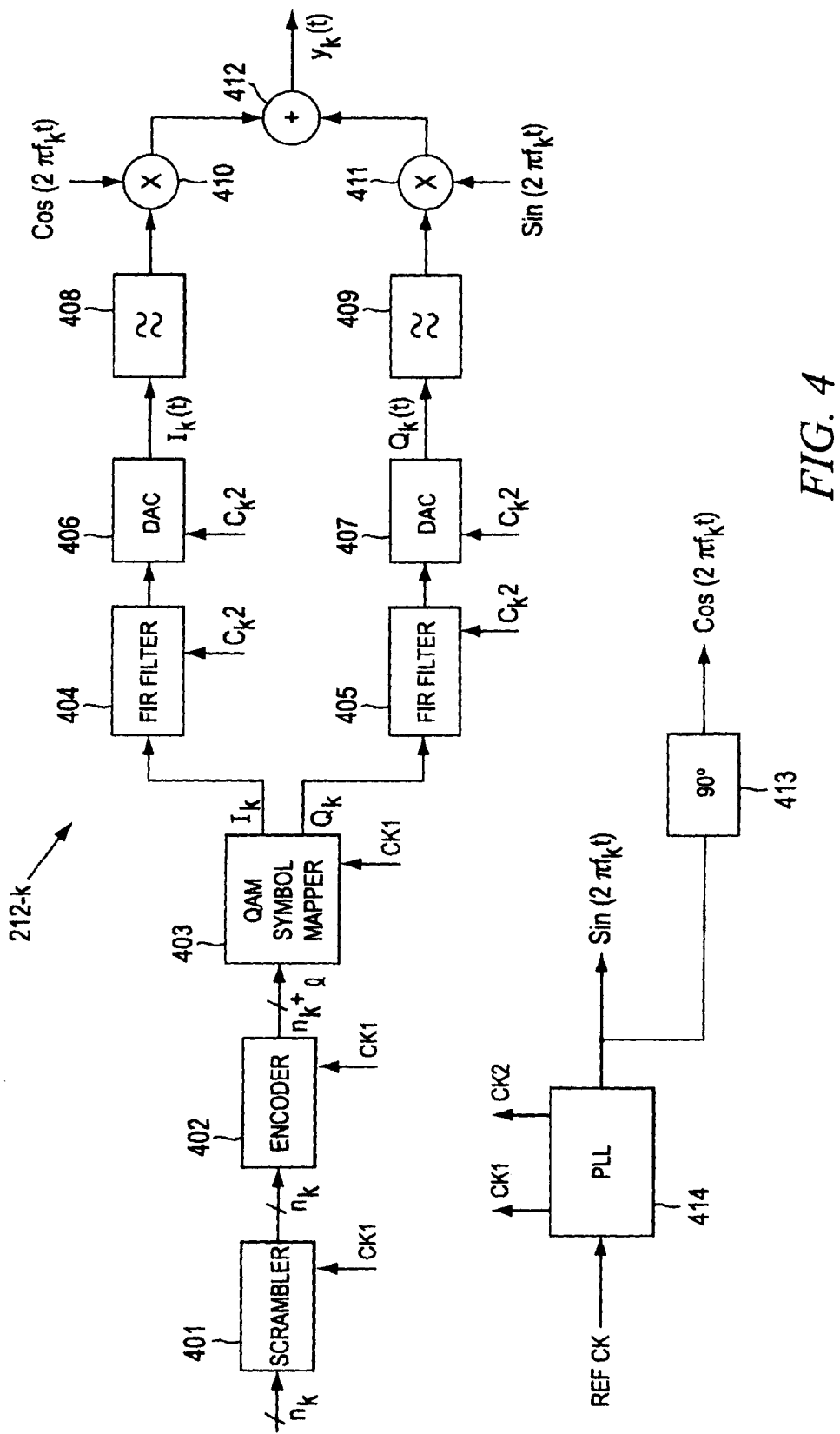
Figure 5:
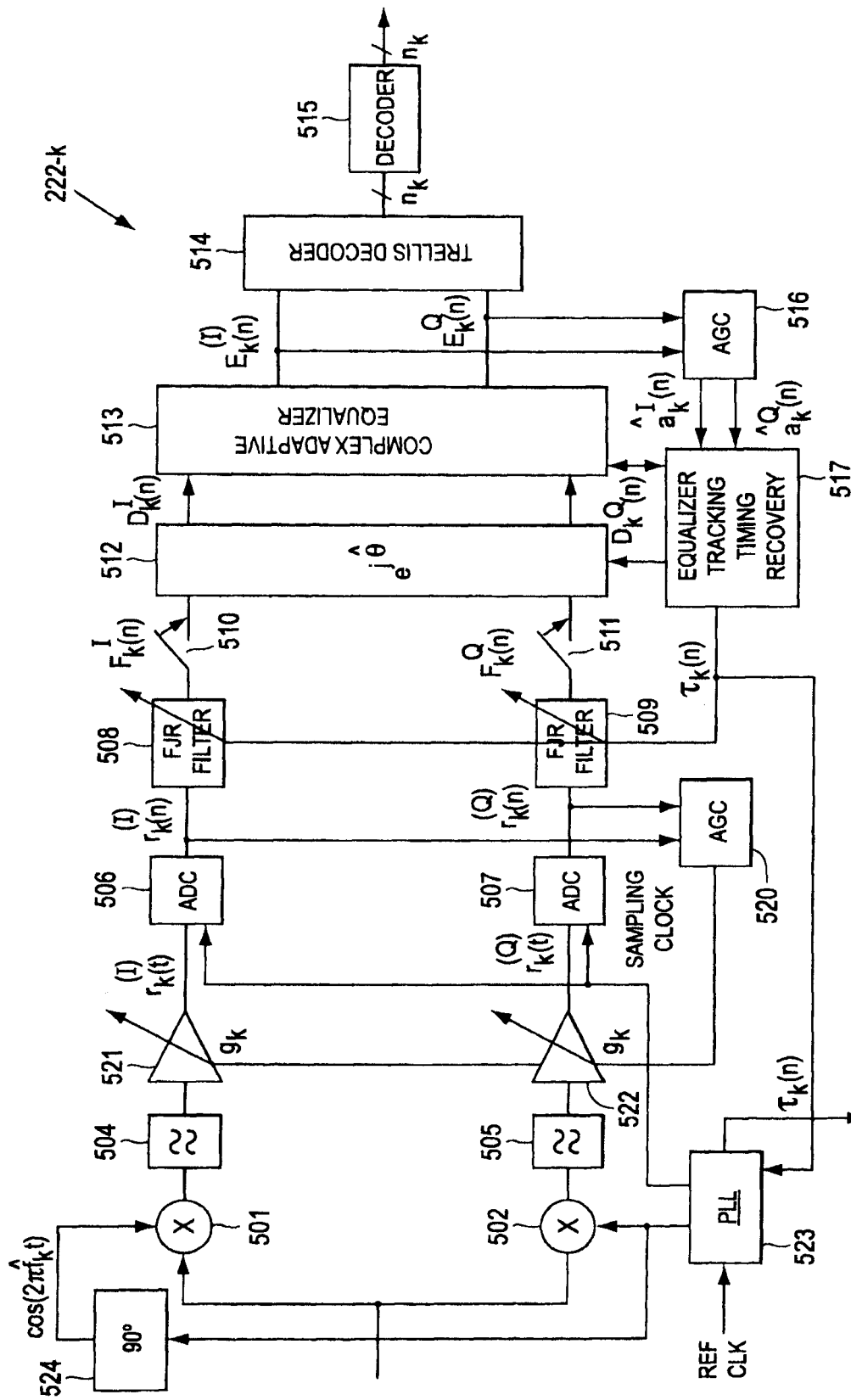
Figure 8:
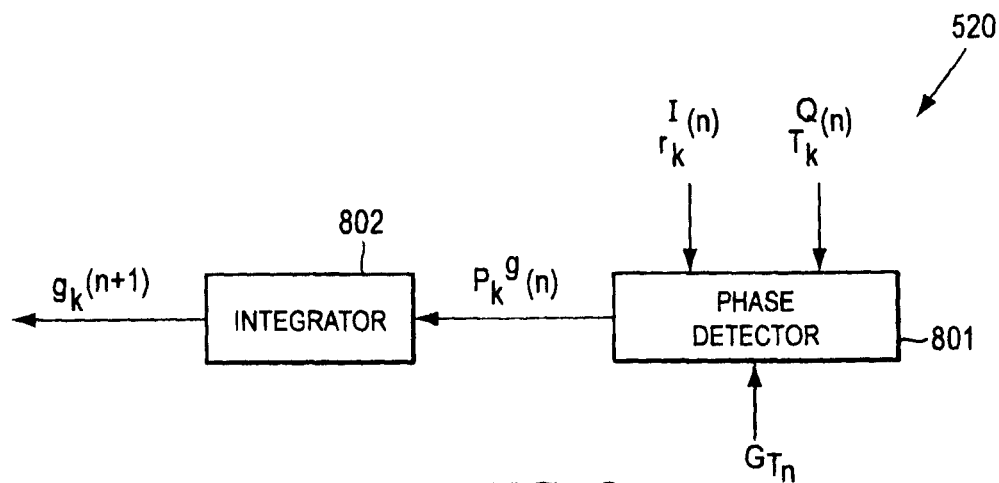
Figure 9:
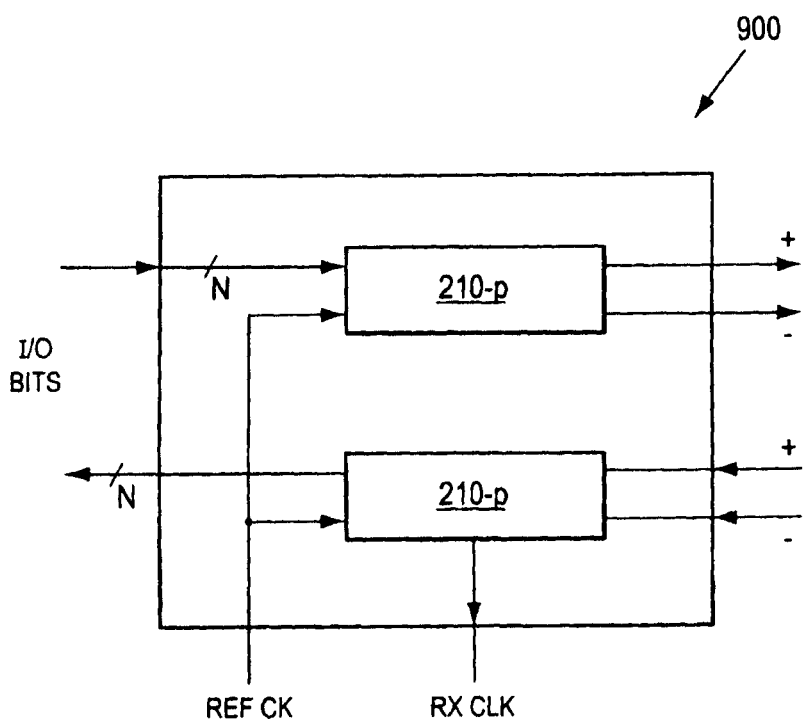

It is certified that error appears in the above-identified patent and that said Letters Patent is hereby corrected as shown below:

In FIGS. 1A-1C, please replace FIGS. 1A-1C with the enclosed replacement sheet FIGS. 1A-1C.

In FIG. 2B, please replace FIG. 2B with the enclosed replacement sheet FIG. 2B.

In FIG. 2C, please replace FIG. 2C with the enclosed replacement sheet FIG. 2C.

In FIG. 4, please replace FIG. 4 with the enclosed replacement sheet FIG. 4.

In FIG. 5, please replace FIG. 5 with the enclosed replacement sheet FIG. 5.

In FIGS. 8 and 9, please replace FIGS. 8 and 9 with the enclosed replacement sheet FIGS. 8 and 9.

In claim 1, column 17, line 23, delete second instance of "associated with the at least one of the K demodulators".

In claim 15, column 18, line 22, delete "further".

Signed and Sealed this

Second Day of March, 2010

David J. Kappos
*Director of the United States Patent and Trademark Office*